US012630740B2

(12) United States Patent　　(10) Patent No.: US 12,630,740 B2
Ma et al.　　(45) Date of Patent: May 19, 2026

(54) COMPOSITIONS CONTAINING THERMALLY CONDUCTIVE FILLERS

(71) Applicant: PPG Industries Ohio, Inc., Cleveland, OH (US)

(72) Inventors: Liang Ma, Allison Park, PA (US); Lorraine Hsu, Allison Park, PA (US); Allison G. Condie, Valencia, PA (US); Marvin M. Pollum, Jr., Pittsburgh, PA (US); Maria S. French, Berkshire (GB)

(73) Assignee: PPG Industries Ohio, Inc., Cleveland, OH (US)

( * ) Notice: Subject to any disclaimer, the term of this patent is extended or adjusted under 35 U.S.C. 154(b) by 696 days.

(21) Appl. No.: 17/757,102

(22) PCT Filed: Dec. 11, 2020

(86) PCT No.: PCT/US2020/064499
§ 371 (c)(1),
(2) Date: Jun. 9, 2022

(87) PCT Pub. No.: WO2021/119419
PCT Pub. Date: Jun. 17, 2021

(65) Prior Publication Data
US 2023/0019038 A1　　Jan. 19, 2023

Related U.S. Application Data

(60) Provisional application No. 63/010,396, filed on Apr. 15, 2020, provisional application No. 62/946,784, filed on Dec. 11, 2019.

(51) Int. Cl.
*C09D 181/04* (2006.01)
*B29C 48/00* (2019.01)
(Continued)

(52) U.S. Cl.
CPC .......... *C09D 181/04* (2013.01); *B29C 48/022* (2019.02); *B33Y 70/10* (2020.01);
(Continued)

(58) Field of Classification Search
CPC ..... C09D 181/04; B29C 48/022; B33Y 70/10; B33Y 10/00; C09K 5/14; H01M 10/613;
(Continued)

(56) References Cited

U.S. PATENT DOCUMENTS 2,466,963 A　　4/1949　Patrick et al.
4,623,711 A　　11/1986　Morris et al.
(Continued)

FOREIGN PATENT DOCUMENTS

AU　　2016201430 A1　　5/2017
AU　　2020100996 A4　　7/2020
(Continued)

OTHER PUBLICATIONS

Sigma-Aldrich, Dithiole molar mass, https://www.SigmaAldrich.com.*
(Continued)

*Primary Examiner* — Kaity V Chandler

(57) ABSTRACT

Disclosed herein is a composition comprising a thiol-terminated compound; an oxidant; and a thermally conductive filler package comprising thermally conductive, electrically insulative filler particles. The thermally conductive, electrically insulative filler particles have a thermal conductivity of at least 5 W/m·K (measured according to ASTM D7984) and a volume resistivity of at least 1 Ω·m (measured according to ASTM D257, C611, or B193) and may be present in an amount of at least 50% by volume based on total volume of the filler package. The thermally conductive filler package may be present in an amount of 15% by volume percent to 90% by volume based on total volume of the composition.

(Continued)

The present invention also is directed to a method for treating a substrate and to substrates comprising a layer formed from a composition disclosed herein.

19 Claims, 2 Drawing Sheets

(51) Int. Cl.

| | |
|---|---|
| *B33Y 70/10* | (2020.01) |
| *C09K 5/14* | (2006.01) |
| *H01M 10/613* | (2014.01) |
| *H01M 10/653* | (2014.01) |
| *H01M 10/6551* | (2014.01) |
| *H01M 10/6554* | (2014.01) |
| *H01M 50/209* | (2021.01) |
| *H01M 50/471* | (2021.01) |
| *B33Y 10/00* | (2015.01) |
| *C08K 3/22* | (2006.01) |
| *C08K 3/28* | (2006.01) |
| *C08K 3/38* | (2006.01) |
| *C08K 5/09* | (2006.01) |

(52) U.S. Cl.
CPC ............. *C09K 5/14* (2013.01); *H01M 10/613* (2015.04); *H01M 10/653* (2015.04); *H01M 10/6551* (2015.04); *H01M 10/6554* (2015.04); *H01M 50/471* (2021.01); *B29K 2995/0007* (2013.01); *B29K 2995/0013* (2013.01); *B33Y 10/00* (2014.12); *C08K 3/22* (2013.01); *C08K 2003/2227* (2013.01); *C08K 3/28* (2013.01); *C08K 2003/282* (2013.01); *C08K 3/38* (2013.01); *C08K 2003/385* (2013.01); *C08K 5/09* (2013.01)

(58) Field of Classification Search
CPC ........... H01M 10/653; H01M 10/6551; H01M 10/6554; H01M 50/471; H01M 50/209; B29K 2995/0007; B29K 2995/0013; C08K 3/22; C08K 3/28; C08K 3/38; C08K 5/09; C08K 2003/2227; C08K 2003/282; C08K 2003/385; C08K 3/24; C08K 2003/387; C08K 3/013; Y02E 60/10
See application file for complete search history.

(56) References Cited

U.S. PATENT DOCUMENTS

| | | | |
|---|---|---|---|
| 4,793,867 | A | 12/1988 | Charles et al. |
| 5,077,325 | A | 12/1991 | Akutagawa et al. |
| 5,588,989 | A | 12/1996 | Vonk et al. |
| 5,834,120 | A | 11/1998 | Murray et al. |
| 6,294,249 | B1 | 9/2001 | Hamer et al. |
| 6,372,849 | B2 | 4/2002 | DeMoss et al. |
| 7,438,974 | B2 | 10/2008 | Obuhowich |
| 7,749,368 | B2 | 7/2010 | McMurdie et al. |
| 7,858,703 | B2 | 12/2010 | Zook et al. |
| 8,465,666 | B2 | 6/2013 | Asahi et al. |
| 8,673,091 | B2 | 3/2014 | McMillen et al. |
| 8,796,190 | B2 | 8/2014 | Kato et al. |
| 8,901,256 | B2 | 12/2014 | Pajel et al. |
| 9,425,373 | B2 | 8/2016 | Aketa et al. |
| 9,562,175 | B2 | 2/2017 | Asay et al. |
| 9,809,735 | B2 | 11/2017 | Yoshihara et al. |
| 9,826,623 | B2 | 11/2017 | Koukami et al. |
| 9,994,754 | B2 | 6/2018 | Clough |
| 10,030,138 | B2 | 7/2018 | Nonomura et al. |
| 10,280,348 | B2 | 5/2019 | Virnelson |
| 2002/0151642 | A1 | 10/2002 | Nakagawa et al. |
| 2005/0006077 | A1 | 1/2005 | Takata et al. |
| 2005/0155751 | A1 | 7/2005 | Azuma et al. |
| 2006/0058451 | A1 | 3/2006 | Gommans et al. |
| 2006/0079617 | A1 | 4/2006 | Kappes et al. |
| 2006/0099338 | A1 | 5/2006 | Boelz et al. |
| 2006/0254164 | A1 | 11/2006 | Ueda et al. |
| 2007/0003721 | A1 | 1/2007 | Ohta et al. |
| 2007/0241303 | A1 | 10/2007 | Zhong et al. |
| 2008/0007890 | A1 | 1/2008 | Harmon et al. |
| 2008/0241488 | A1 | 10/2008 | Ohta et al. |
| 2009/0062449 | A1 | 3/2009 | Wang |
| 2009/0314759 | A1 | 12/2009 | Schaeffer et al. |
| 2010/0010133 | A1 | 1/2010 | Zook et al. |
| 2010/0012884 | A1 | 1/2010 | Nakamichi et al. |
| 2011/0027565 | A1 | 2/2011 | Matsumoto et al. |
| 2011/0159296 | A1 | 6/2011 | Maenaka et al. |
| 2011/0259564 | A1 | 10/2011 | Izutani et al. |
| 2012/0022842 | A1 | 1/2012 | Amadu |
| 2012/0121842 | A1 | 5/2012 | Hoshino et al. |
| 2012/0129980 | A1 | 5/2012 | Desai et al. |
| 2012/0135202 | A1 | 5/2012 | Weidinger et al. |
| 2012/0217434 | A1 | 8/2012 | Roy |
| 2012/0252971 | A1 | 10/2012 | Schreiber et al. |
| 2013/0302659 | A1 | 11/2013 | Terada et al. |
| 2014/0113516 | A1 | 4/2014 | Tanaka et al. |
| 2014/0162059 | A1 | 6/2014 | Wan et al. |
| 2014/0234560 | A1 | 8/2014 | Miyata et al. |
| 2014/0367883 | A1 | 12/2014 | Hatakeyama et al. |
| 2015/0079350 | A1 | 3/2015 | Tanaka |
| 2015/0125646 | A1 | 5/2015 | Tournilhac et al. |
| 2015/0140411 | A1 | 5/2015 | Li et al. |
| 2015/0232718 | A1 | 8/2015 | Wu et al. |
| 2015/0351217 | A1 | 12/2015 | Koukami et al. |
| 2015/0359134 | A1 | 12/2015 | Soong et al. |
| 2016/0032166 | A1 | 2/2016 | Zhang et al. |
| 2016/0118316 | A1 | 4/2016 | Aramaki et al. |
| 2016/0145411 | A1 | 5/2016 | Uibel et al. |
| 2016/0312097 | A1 | 10/2016 | Kitada et al. |
| 2016/0340191 | A1 | 11/2016 | Ikemiya et al. |
| 2017/0012259 | A1 | 1/2017 | Lin et al. |
| 2017/0040570 | A1 | 2/2017 | Kim et al. |
| 2017/0222285 | A1 | 8/2017 | Li et al. |
| 2017/0244142 | A1 | 8/2017 | Yao et al. |
| 2017/0250386 | A1 | 8/2017 | Pan et al. |
| 2017/0256764 | A1 | 9/2017 | Li |
| 2017/0256828 | A1 | 9/2017 | Li et al. |
| 2017/0256830 | A1 | 9/2017 | Qiu et al. |
| 2017/0256832 | A1 | 9/2017 | Li et al. |
| 2017/0256834 | A1 | 9/2017 | Li |
| 2017/0335160 | A1 | 11/2017 | Yamazaki et al. |
| 2017/0362473 | A1 | 12/2017 | Butterbach et al. |
| 2018/0034024 | A1 | 2/2018 | Chen et al. |
| 2018/0044191 | A1 | 2/2018 | Song et al. |
| 2018/0094171 | A1 | 4/2018 | Briers et al. |
| 2018/0108888 | A1 | 4/2018 | Chen et al. |
| 2018/0151929 | A1 | 5/2018 | Song et al. |
| 2018/0194982 | A1 | 7/2018 | Ezaki et al. |
| 2018/0208820 | A1 | 7/2018 | Tsuda et al. |
| 2018/0230290 | A1 | 8/2018 | Saga et al. |
| 2018/0244578 | A1 | 8/2018 | Nishio et al. |
| 2018/0265751 | A1 | 9/2018 | Babilo et al. |
| 2018/0362822 | A1 | 12/2018 | Eichler et al. |
| 2019/0040183 | A1 | 2/2019 | Yoshida et al. |
| 2019/0153236 | A1 | 5/2019 | Li et al. |
| 2019/0270850 | A1 | 9/2019 | Toolis et al. |
| 2019/0345332 | A1 | 11/2019 | Shimada et al. |
| 2020/0231794 | A1 | 7/2020 | Treat et al. |
| 2021/0395483 | A1 | 12/2021 | Ma et al. |
| 2022/0002606 | A1 | 1/2022 | Ganapatibhotla et al. |
| 2022/0267563 | A1 | 8/2022 | Mezzanotti et al. |
| 2023/0193106 | A1 | 6/2023 | Ma et al. |
| 2023/0212435 | A1 | 7/2023 | Ma et al. |
| 2023/0220219 | A1 | 7/2023 | Ma et al. |

FOREIGN PATENT DOCUMENTS

| | | |
|---|---|---|
| CN | 103642356 A | 3/2014 |
| CN | 102767243 B | 1/2015 |
| CN | 102260413 B | 4/2015 |

(56) References Cited

FOREIGN PATENT DOCUMENTS

| | | | |
|---|---|---|---|
| CN | 104629187 | A | 5/2015 |
| CN | 105789505 | A | 7/2016 |
| CN | 205406676 | U | 7/2016 |
| CN | 105968970 | A | 9/2016 |
| CN | 205723711 | U | 11/2016 |
| CN | 205723865 | U | 11/2016 |
| CN | 107189402 | A | 9/2017 |
| CN | 104789175 | B | 12/2017 |
| CN | 107987533 | A | 5/2018 |
| CN | 108291076 | A | 7/2018 |
| CN | 108752628 | A | 11/2018 |
| CN | 108753001 | A | 11/2018 |
| CN | 109666434 | A | 4/2019 |
| CN | 111286081 | A | 6/2020 |
| CN | 108699217 | B | 10/2020 |
| DE | 10259549 | A1 | 7/2004 |
| DE | 102014008000 | B4 | 2/2023 |
| EP | 0583617 | A1 | 2/1994 |
| EP | 0932589 | A2 | 8/1999 |
| EP | 2177570 | A1 | 4/2010 |
| EP | 2402395 | A2 | 1/2012 |
| EP | 2789594 | A1 | 10/2014 |
| EP | 3266745 | A1 | 1/2018 |
| EP | 2942193 | B1 | 10/2018 |
| EP | 3064560 | B1 | 5/2022 |
| IN | 201811038499 | A | 4/2020 |
| JP | 2008169265 | A | 7/2008 |
| JP | 4495772 | B1 | 7/2010 |
| JP | 2012219251 | A | 11/2012 |
| KR | 20140019357 | A | 2/2014 |
| RU | 2162871 | C2 | 2/2001 |
| RU | 2205840 | C2 | 6/2003 |
| RU | 2499656 | C2 | 11/2013 |
| RU | 2012109988 | A | 11/2013 |
| TW | 201337968 | A | 9/2013 |
| WO | 98/17842 | A2 | 4/1998 |
| WO | 98/18835 | A1 | 5/1998 |
| WO | 2000000228 | A1 | 1/2000 |
| WO | 2000003100 | A1 | 1/2000 |
| WO | 2007009556 | A1 | 1/2007 |
| WO | 2011125636 | A1 | 10/2011 |
| WO | 2012048860 | A1 | 4/2012 |
| WO | 2012114309 | A1 | 8/2012 |
| WO | 2012114310 | A1 | 8/2012 |
| WO | 2013177850 | A1 | 12/2013 |
| WO | 2014202649 | A1 | 12/2014 |
| WO | 2015067569 | A1 | 5/2015 |
| WO | 2015076985 | A1 | 5/2015 |
| WO | WO-2016126815 | A1 * | 8/2016 ............... A61F 7/02 |
| WO | 2016139221 | A1 | 9/2016 |
| WO | 2016198425 | A1 | 12/2016 |
| WO | 2017072364 | A1 | 5/2017 |
| WO | 2017106066 | A1 | 6/2017 |
| WO | 2017/145410 | A1 | 8/2017 |
| WO | 2017173195 | A1 | 10/2017 |
| WO | 2017198017 | A1 | 11/2017 |
| WO | 2018016580 | A1 | 1/2018 |
| WO | 2018030079 | A1 | 2/2018 |
| WO | 2018067443 | A1 | 4/2018 |
| WO | 2018095759 | A1 | 5/2018 |
| WO | 2018180470 | A1 | 10/2018 |
| WO | 2019021825 | A1 | 1/2019 |
| WO | 2019021826 | A1 | 1/2019 |
| WO | 2019220288 | A1 | 11/2019 |
| WO | 2019220291 | A1 | 11/2019 |
| WO | 2020077333 | A1 | 4/2020 |
| WO | 2020079556 | A1 | 4/2020 |
| WO | 2020/191202 | A1 | 9/2020 |
| WO | 2020/222897 | A1 | 11/2020 |
| WO | 2021/025756 | A1 | 2/2021 |
| WO | 2021011628 | A1 | 2/2021 |
| WO | 2021/119419 | A1 | 6/2021 |
| WO | 2021211183 | A1 | 10/2021 |
| WO | 2021211184 | A1 | 10/2021 |
| WO | 2021211694 | A1 | 10/2021 |
| WO | 2021211722 | A1 | 10/2021 |
| WO | 2022/010972 | A1 | 1/2022 |

OTHER PUBLICATIONS

MatWeb, Material Property Data, https://matweb.com/search/DataSheet.aspx, graphite properties.*

Sliceengineering.com, properties of boron nitride.*

Precision-ceramics, www.precision-ceramics.com, boron nitride resistivity.*

International Search Report and Written Opinion received for PCT Application Serial No. PCT/US2021/014100 dated Apr. 7, 2021, 14 pages.

International Search Report and Written Opinion received for PCT Application Serial No. PCT/US2020/064499 dated Mar. 26, 2021, 11 pages.

Milke, James, et al., FEMA 403 report, Federal Emergency Management Agency, World Trade Center Building Performance Study, "Appendix A: Overview of Fire Protection in Buildings", pp. A-1 through A-28, May 2002.

* cited by examiner

COMPOSITIONS CONTAINING THERMALLY CONDUCTIVE FILLERS

CROSS-REFERENCE TO RELATED APPLICATION

This application claims priority to U.S. Provisional Application No. 62/946,784, filed on Dec. 11, 2019, and U.S. Provisional Application No. 63/010,396, filed on Apr. 15, 2020, both of which are entitled "Compositions Containing Thermally Conductive Fillers."

FIELD OF THE INVENTION

The present invention relates to compositions containing a thermally conductive filler component, for example sealants, adhesives, putties, and coating compositions.

BACKGROUND OF THE INVENTION

Coating compositions, including sealants and adhesives, are utilized in a wide variety of applications to treat a variety of substrates or to bond together two or more substrate materials.

The present invention is directed toward one-component and two-component compositions that contain thermally conductive fillers.

SUMMARY OF THE INVENTION

The present invention is directed to a composition comprising: a thiol-terminated compound; an oxidant; and a thermally conductive filler package comprising thermally conductive, electrically insulative filler particles, the thermally conductive, electrically insulative filler particles having a thermal conductivity of at least 5 W/m·K (measured according to ASTM D7984) and a volume resistivity of at least 1 Ω·m (measured according to ASTM D257, C611, or B193), wherein the thermally conductive, electrically insulative filler particles are present in an amount of at least 50% by volume based on total volume of the filler package.

The present invention also is directed to a method for treating a substrate comprising contacting at least a portion of a surface of the substrate with a composition of the present invention.

The present invention also is directed to a coating, wherein the coating, in an at least partially cured state, has at least one of the following:

(a) a thermal conductivity of at least 0.4 W/m·K (measured according to ASTM D7984);

(b) a dielectric strength of at least 1 kV/mm measured according to ASTM D149 on a dielectric meter (Sefetec RMG12AC-DC) connected to two copper electrodes with 1-inch diameter;

(c) a shore A hardness 5 to 95 measured according to ASTM D2240 with a Type A durometer (Model 2000, Rex Gauge Company, Inc.) at room temperature;

(d) a 180° peel strength of at least 1 lbf/in (measured according to SAE AS5127/1B with an Instron universal testing machine, model 3345);

(e) a tensile stress at break of 1 MPa to 100 MPa, as determined according to ISO 37-2 using an Instron universal testing machine, model 3345 with a pull rate of 2 inches/min;

(f) an elongation of 1% to 900%, as determined according to ISO 37-2 using an Instron universal testing machine, model 3345 with a pull rate of 2 inches/min; and/or (g) a Young's modulus of 0.01 MPa to 100 MPa, as determined according to ISO 37-2 using an Instron universal testing machine, model 3345 with a pull rate of 2 inches/min.

The present invention also is directed to a substrate comprising a surface at least partially coated with a layer formed from a composition of the present invention.

The present invention also is directed to a thermally conductive part formed from a composition of the present invention.

The present invention also is directed to a battery pack comprising at least two battery cells and a thermally conductive part formed from a composition of the present invention.

The present invention also is directed to a circuit board comprising a thermally conductive part formed from a composition of the present invention.

DETAILED DESCRIPTION OF THE INVENTION

Figure 1:
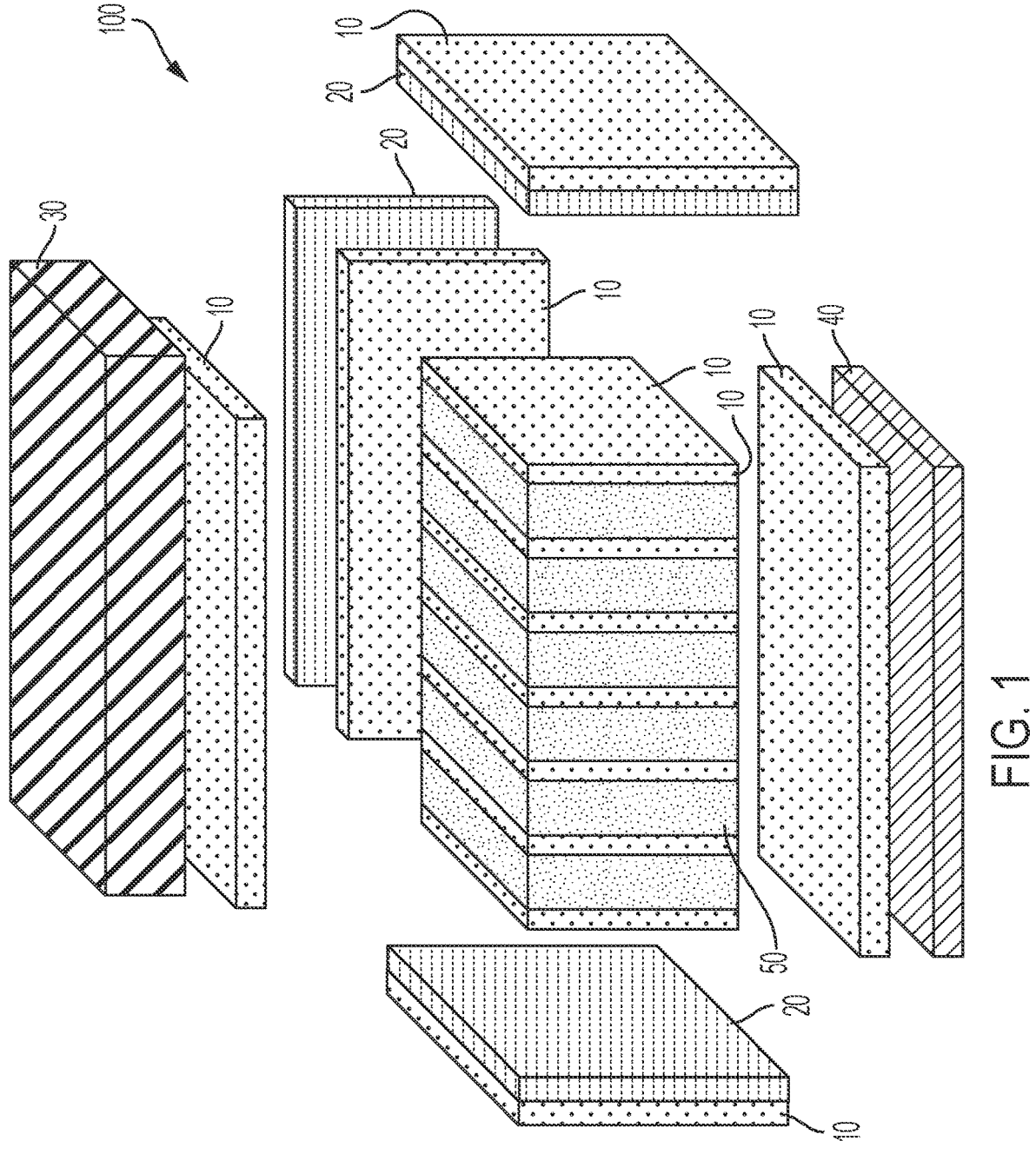
FIGS. 1 and 2 are schematic perspective views illustrating a thermally conductive member utilized in a battery pack.

For purposes of this detailed description, it is to be understood that the invention may assume alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

In this application, the use of the singular includes the plural and plural encompasses singular, unless specifically stated otherwise. For example, although reference is made herein to "an" oxide, "a" polysulfide, or "a" filler material, a combination (i.e., a plurality) of these components may be used.

In addition, in this application, the use of "or" means "and/or" unless specifically stated otherwise, even though "and/or" may be explicitly used in certain instances.

As used herein, the terms "on," "onto," "applied on," "applied onto," "formed on," "deposited on," "deposited onto," and the like mean formed, overlaid, deposited, or provided on, but not necessarily in contact with, a substrate surface. For example, a composition "applied onto" a substrate surface does not preclude the presence of one or more other intervening coating layers or films of the same or different composition located between the composition and the substrate surface.

As used herein, a "coating composition" refers to a composition, e.g., a solution, mixture, or a dispersion, that, in an at least partially dried or cured state, is capable of producing a film, layer, or the like on at least a portion of a substrate surface.

As used herein, a "sealant composition" refers to a coating composition, e.g., a solution, mixture, or a dispersion, that, in an at least partially dried or cured state, has the ability to resist atmospheric conditions and particulate matter, such as moisture and temperature and at least partially block the transmission of materials, such as particulates, water, fuel, and other liquids and gasses.

As used herein, a "gap filler composition" refers to a coating composition, e.g., a solution, mixture, or a dispersion, that, in an at least partially dried or cured state, fills a gap.

As used herein, an "adhesive composition" refers to a coating composition, e.g., a solution, mixture, or a dispersion, that, in an at least partially dried or cured state, produces a load-bearing joint, such as a load-bearing joint having a lap shear strength of at least 0.05 MPa, as determined according to ASTM D1002-10 using an Instron universal testing machine, model 3345 in tensile mode with a pull rate of 1 mm per minute.

As used herein, the term "one component" or "1K" refers to a composition in which all of the ingredients may be premixed and stored at ambient conditions or optionally may be premixed and frozen and stored ("pre-mixed frozen" or "PMF" as described below), and wherein the reactive components do not readily react at stored conditions and remain "workable" for at least 10 days after mixing, but instead react only upon activation by an external energy source, under pressure, and/or under high shear force, and in the case of PMFs, thawing. External energy sources that may be used to promote curing include, for example, radiation (i.e., actinic radiation such as ultraviolet light) and/or heat. As used herein, the term "workable" means that the composition is of a viscosity that it is able to be deformed and/or shaped under manual pressure and may have a viscosity less than such viscosity.

As further defined herein, ambient conditions generally refer to room temperature and humidity conditions or temperature and humidity conditions that are typically found in the area in which the composition is applied to a substrate, e.g., at 20° C. to 40° C. and 20% to 80% relative humidity, while slightly thermal conditions are temperatures that are slightly above ambient temperature.

As used herein, the term "two-component" or "2K" refers to a composition in which at least a portion of the reactive components readily associate to form an interaction or react to form a bond (physically or chemically), and at least partially cure without activation from an external energy source, such as at ambient or slightly thermal conditions, when mixed. One of skill in the art understands that the two components of the composition are stored separately from each other and mixed just prior to application of the composition. Two-component compositions may optionally be heated or baked, as described below.

As used herein, the term "cure" or "curing", means that the components that form the composition are crosslinked to form a film, layer, or bond. As used herein, the term "at least partially cured" means that at least a portion of the components that form the composition interact, react, and/or are crosslinked to form a film, layer, or bond. In the case of a 1K composition, the composition is at least partially cured or cured when the composition is subjected to curing conditions that lead to the reaction of the reactive functional groups of the components of the composition. In the case of a 2K composition, the composition is at least partially cured or cured when the components of the composition are mixed to lead to the reaction of the reactive functional groups of the components of the composition.

As used herein, the term "monofunctional" means an atom or molecule that is only capable of reacting to form one new bond.

As used herein, the term "polyfunctional" means an atom or a molecule that is capable of reacting to form more than one new bond more than one time through the same atom and/or through multiple single reactions of atoms within the molecule. For clarity, polyfunctional includes difunctional.

As used herein, the term "thermally conductive filler" or "TC" filler means a pigment, filler, or inorganic powder that has a thermal conductivity of at least 5 W/m·K at 25° C. (measured according to ASTM D7984).

As used herein, the term "non-thermally conductive filler" or "NTC filler" means a pigment, filler, or inorganic powder that has a thermal conductivity of less than 5 W/m·K at 25° C. (measured according to ASTM D7984).

As used herein, the term "electrically insulative filler" or "EI filler" means a pigment, filler, or inorganic powder that has a volume resistivity of at least 1 Ω·m (measured according to ASTM D257, C611, or B193).

As used herein, the term "electrically conductive filler" or "EC filler" means a pigment, filler, or inorganic powder that has a volume resistivity of less than 1 Ω·m (measured according to ASTM D257, C611, or B193).

As used herein, the term "accelerator" means a substance that increases the rate or decreases the activation energy of a chemical reaction. An accelerator may be either a "catalyst," that is, without itself undergoing any permanent chemical change, or may be reactive, that is, capable of chemical reactions and includes any level of reaction from partial to complete reaction of a reactant.

As used herein, the term "solvent" refers to a molecule or a compound that has a high vapor pressure such as greater than 2 mm Hg at 25° C. determined by differential scanning calorimetry according to ASTM E1782 and is used to lower the viscosity of a resin but that does not have a reactive functional group capable of reacting with a functional group(s) on molecules or compounds in a composition.

As used herein, the term "reactive diluent" refers to a molecule or a compound that has a low vapor pressure such as 2 mm Hg or less at 25° C. determined by differential scanning calorimetry according to ASTM E1782 and is used to lower the viscosity of a resin but that has at least one functional group capable of reacting with a functional group(s) on molecules or compounds in a composition.

As used herein, the term "plasticizer" refers to a molecule or a compound that does not have a functional group capable of reacting with a functional group(s) on molecules or compounds in a composition and that is added to the composition to adjust viscosity, adjust glass transition temperature (Tg), facilitate application, and impart flexibility.

As used herein, the volume percentage of each ingredient is calculated using below equation:

$$vol\% \text{ (ingredient)} = \frac{\text{volume of ingredient}}{\text{volume of total composition}} \times 100\%$$

wherein the volume of the ingredient is calculated by $$\frac{\text{Weight of ingredient}}{\text{True Density of ingredient}}.$$

Disclosed herein is a composition comprising, or consisting essentially of, or consisting of: a thiol-terminated compound; an oxidant; and a thermally conductive filler package comprising thermally conductive, electrically insulative filler particles, the thermally conductive, electrically insulative filler particles having a thermal conductivity of at least 5 W/m·K (measured according to ASTM D7984) and a volume resistivity of at least 1 Ω·m (measured according to ASTM D257, C611, or B193.

The composition may be a coating composition, such as a sealant composition, an adhesive composition, a gap filler composition, a putty, a 3D-printable composition or may be used in its at least partially dried or cured state to form a film, layer, or the like, or a part, such as a casted, molded, extruded, or machined part.

As stated above, the composition comprises, or consists essentially of, or consists of, a thiol-terminated compound. The thiol-terminated compound may be a monomer, a polymer, and/or an oligomer. Suitable thiol-terminated compounds are disclosed in U.S. Pat. No. 7,858,703B2, incorporated herein by reference in its entirety. The thiol-terminated compound may comprise a liquid.

Suitable thiol-terminated compounds useful in the compositions of the present invention for preparing the thiol-terminated polymer include compounds, monomers or polymers having at least two thiol groups. Useful polythiols include dithiols having the formula (I):

HS—R$^1$—SH　　　　　　　　　　　　　　(I)

where R$^1$ can be a C$_{2\text{-}6}$ n-alkylene group; C$_{3\text{-}6}$ branched alkylene group, having one or more pendant groups which can be, for example, hydroxyl groups, alkyl groups such as methyl or ethyl groups; alkoxy groups, C$_{6\text{-}8}$ cycloalkylene; C$_{6\text{-}10}$ alkylcycloalkylene group; —[(—CH$_2$)$_p$—X]$_q$—(—CH$_2$)$_r$—; or —[(—CH$_2$)$_p$—X]$_q$—(—CH$_2$)$_r$— in which at least one —CH$_2$— unit is substituted with a methyl group and in which p is an independently selected integer ranging from 2 to 6, q is an independently selected integer ranging from 1 to 5 and r is an independently selected integer ranging from 2 to 10.

Further useful dithiols include one or more heteroatom substituents in the carbon backbone, that is, dithiols in which X includes a heteroatom such as O, S, S—S or another bivalent heteroatom radical; a secondary or tertiary amine group, i.e., —NR$^6$—, where R$^6$ is hydrogen or methyl; or another substituted trivalent heteroatom. In an example, X is O or S, and thus R$^1$ is —[(—CH$_2$—)$_p$—O-]$_q$— (—CH$_2$—)$_r$— or —[(—CH$_2$—)$_p$—S—]$_q$—(—CH$_2$—)$_r$—. In examples, p and r may be equal, and in an example both have the value of 2.

Useful polythiols include but are not limited to dithiols such as 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethyl sulfide, dimercaptodioxaoctane, 1,5-dimercapto-3-oxapentane and mixtures thereof. The polythiol material can have one or more pendant groups selected from lower alkyl groups, lower alkoxy groups and hydroxyl groups. Suitable alkyl pendant groups include C$_1$-C$_6$ linear alkyl, C$_3$-C$_6$ branched alkyl, cyclopentyl, and cyclohexyl.

Useful dithiols include dimercaptodiethylsulfide (DMDS) (p=2, r=2, q=1, X=S); dimercaptodioxaoctane (DMDO) (p=2, q=2, r=2, X=0); and 1,5-dimercapto-3-oxapentane (p=2, r=2, q=1, X=O). It is also possible to use dithiols that include both heteroatom substituents in the carbon backbone and pendant alkyl groups, such as methyl groups. Such compounds include methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS such as HS—CH$_2$CH(CH$_3$)—S—CH(CH$_3$)CH$_2$—SH and HS—CH(CH$_3$)CH$_2$—S—CH$_2$CH(CH$_3$)—SH.

Two or more different polythiols can be used if desired in the compositions of the present invention.

A thiol-terminated compound useful in the compositions of the present invention may have the structure of formula (II):

HS—R$^1$—[—S—(CH$_2$)$_p$—O—(—R$^2$—O—)$_m$—
　(CH$_2$)$_q$—S—R$^1$—]$_n$—SH　　　　　　　(II)

wherein R$^1$ denotes a C$_{2\text{-}10}$ n-alkylene, C$_{2\text{-}6}$ branched alkylene, C$_{6\text{-}8}$ cycloalkylene or C$_{6\text{-}10}$ alkylcycloalkylene group, heterocyclic, —[(—CH$_2$)$_p$—X]$_q$—(—CH$_2$)$_r$; or —[(—CH$_2$)$_p$—X]$_q$—(—CH$_2$)$_r$— in which at least one —CH$_2$— unit is substituted with a methyl group; R$^2$ denotes a C$_{2\text{-}10}$ n-alkylene, C$_{2\text{-}6}$ branched alkylene, C$_{6\text{-}8}$ cycloalkylene or C$_{6\text{-}14}$ alkylcycloalkylene group, heterocyclic, —[(—CH$_2$)$_p$—X]$_q$—(—CH$_2$)$_r$; X denotes one selected from the group consisting of O, S, S—S and —NR$^6$—; R$^6$ denotes H or methyl; m is an independently selected rational number from 1 to 50; and n is an independently selected integer from 1 to 60; p is an independently selected integer ranging from 2 to 6; q is an independently selected integer ranging from 1 to 5; and r is an independently selected integer from 2 to 10. In an example of the foregoing polymer, R$^1$ is C$_2$-C$_6$ alkyl and R$^2$ is C$_2$-C$_6$ alkyl.

Polyfunctional thiol-terminated polymers according to the present invention may have the formula:

B—{R$^8$CH$_2$CH$_2$—O—(R$^2$—O)$_m$CH$_2$CH$_2$—S—R$^1$—
　[—S—CH$_2$CH$_2$—O—(R$^2$—O)$_m$—CH$_2$—S—
　R$^1$]$_n$—SH}$_z$ or

B—{R$^8$—S—R$^1$—[—S—CH$_2$CH$_2$—O—(R$^2$—
　O)$_m$—CH$_2$—S—R$^1$]$_n$—SH}$_z$ wherein B denotes a z-valent residue of a polyfunctionalizing agent, $R^1$, $R^2$, n and m denote structures and values discussed above with reference to Formula II, $R^8$ denotes a moiety which is reactive with a terminal vinyl group or mercapto group, and z is an integer from 3 to 6.

Other suitable thiol-terminated monomers for use in the compositions of the present invention include, for example, mercapto-propionates, mercapto-acetates, mercapto-acrylates, and combinations of any of the foregoing.

Examples of suitable mercapto-propionates for use in the compositions of the present invention include pentaerythritol tetra(3-mercapto-propionate) (PETMP), trimethylolpropane tri(3-mercaptopropionate) (TMPMP), glycol di(3-mercaptopropionate) (GDMP), tris[2-(3-mercaptopropionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable polymeric thiols for use in the compositions of the present invention include ethoxylated trimethylolpropane tri(3-mercaptopropionate), polycaprolactone tetra-3-mercaptopropionate, and combinations thereof.

Examples of suitable mercapto-acetates for use in the compositions of the present invention include pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable mercapto-acrylates for use in the compositions of the present invention include pentaerythritol tetra-acrylate, tris[2-(3-mercaptopropionyloxy)ethyl]isocyanurate, 2,3-di(2-mercaptoethylthio)-1-propane-thiol, dimercaptodiethylsulfide (2,2'-thiodiethanethiol), dimercaptodioxaoctane (2,2'-(ethylenedioxy)diethanethiol, 1,8-dimercapto-3,6-dioxaoctane, and combinations of any of the foregoing.

Suitable thiol-terminated monomers for use in compositions of the present invention are commercially available, for example, from Bruno Bock Thiochemicals under the Thiocure® tradename. Suitable thiol-terminated polymers for use in compositions of the present invention are commercially available, for example, from Toray Industries, Inc. under the Thiokol® LP tradename or from Nouryon under the Thioplast® tradename.

The thiol-terminated compound of the present invention may have the structure of Formula (I):

$$HS—R'—SH \qquad (I)$$

wherein $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, substituted $C_{2-6}$ alkanediyl, substituted $C_{6-8}$ cycloalkanediyl, substituted $C_{6-10}$ alkanecycloalkanediyl, substituted $C_{5-8}$ heterocycloalkanediyl and $—[(CHR^3)_p—X]_q—(CHR^3)_r—$; where, each $R^3$ is selected from hydrogen and methyl; each X is independently selected from O, S, S—S, NH, and N(—CH₃); p is an integer from 2 to 6; q is an integer from 1 to 5; and r is an integer from 2 to 10. In examples, each p can independently be 2, 3, 4, 5, and 6. In examples, each p can be the same and can be 2, 3, 4, 5, or 6.

Other suitable thiol-terminated compounds useful in the present invention include those which are commercially available under the trade name Thiokol polysulfides (commercially available from Toray Chemical). Such polysulfide polymers are disclosed in U.S. Pat. No. 2,466,963. Other suitable thiol-terminated compounds useful in the present invention include Thioplasts (commercially available from AkzoNobel).

The thiol-terminated compound may have a weight average molecular weight (Mw) of at least 80 g/mol, such as at least 100 g/mol, such as at least 150 g/mol, and may have a number average molecular weight of no more than 40,000 g/mol, such as no more than 30,000 g/mol, such as no more than 20,000 g/mol. The thiol-terminated compound may have a weight average molecular weight of 80 g/mol to 40,000 g/mol, such as 100 g/mol to 30,000 g/mol, such as 150 g/mol to 20,000 g/mol. As used herein, the term "weight average molecular weight" or "($M_w$)" means the weight average molecular weight ($M_w$) as determined by gel permeation chromatography (GPC) using polystyrene standards for calibration. The GPC determination can be performed using a Waters 2695 separation module with a Waters 410 differential refractometer (RI detector), linear polystyrene standards having molecular weights of from 580 Da to 365,000 Da, tetrahydrofuran (THF) as the eluent at a flow rate of 0.5 mL/min, and an Agilent PLgel Mixed-C column (300×7.5 mm, 5 μm) for separation.

The thiol-terminated compound may be present in the composition in an amount of at least 9.9% by volume based on total volume of the composition, such as at least 24.5% by volume, and may present in the composition in an amount of no more than 84.9% by volume based on total volume of the composition, such as no more than 65% by volume. The thiol-terminated compound may be present in the composition in an amount of 9.9% by volume to 84.9% by volume based on total volume of the composition, such as 24.5% by volume to 65% by volume.

The composition of the present invention also comprises, or consists essentially of, or consists of, an oxidant that polymerizes the thiol-terminated polymers of the present invention to rubbery solids by reducing the thiol functional group of the thiol-terminated compound to form sulfur-sulfur bonds. For example, a mechanism of cure may comprise $2\text{-RSH}+(O)\rightarrow RSSR+H_2O$.

The curing rate may be modified by the addition of additives, such as acidic materials to slow the curing rate or alkaline materials to accelerate the curing rate. Compositions of the present invention can comprise a polysulfide cure retarder or a combination of polysulfide cure retarders. A polysulfide cure retarder can comprise an acid such as a fatty acid, an organic acid, an inorganic acid, a fatty acid salt, or combinations thereof. Examples of suitable polysulfide cure retarders include phenylphosphonic acid and itaconic acid. Cure retarders can improve the stability of the polysulfide cure activator and polysulfide cure accelerator.

Suitable oxidants that may be used in the compositions of the present invention may comprise a metal oxide and/or an organic peroxide. For example, the oxidant may comprise a metal oxide such as zinc oxide, lead oxide, lead dioxide, lead peroxide, manganese dioxide, sodium dichromate, sodium perborate, sodium perborate monohydrate, potassium permanganate, calcium dioxide, calcium peroxide, barium peroxide, lithium peroxide, zinc peroxide, zinc chromate, barium oxide, alkaline dichromate, or combinations thereof. The oxidant may comprise an organic peroxide such as cumene hydroperoxide, t-butyl hydroperoxide, or combinations thereof.

The oxidant may be present in the composition in an amount of at least 0.1% by volume based on total volume of the composition, such as at least 0.5% by volume, and may be present in the composition in an amount of no more than 10% by volume based on total volume of the composition, such as no more than 5% by volume. The oxidant may be present in the composition in an amount of 0.1% by volume to 10% by volume based on total volume of the composition, such as 0.5% by volume to 5% by volume.

The compositions disclosed herein also comprise a thermally conductive filler package comprising, or consisting essentially of, or consisting of, particles of a thermally conductive, electrically insulative filler material (referred to herein as "TC/EI filler material" and described in more detail below). The TC/EI filler material may comprise organic or inorganic material and may comprise particles of a single type of filler material or may comprise a particle of two or more types of TC/EI filler materials. That is, the thermally conductive filler package may comprise particles of a first TC/EI filler material and may further comprise particles of at least a second (i.e., a second, a third, a fourth, etc.) TC/EI filler material that is different from the first TC/EI filler material. In an example, the particles of the first TC/EI filler material may have an average particle size that is at least one order of magnitude greater than an average particle size of the particles of the second TC/EI filler material, such as at least two orders of magnitude greater, such as at least three orders of magnitude greater, wherein the particle sizes may be measured, for example, using a SEM as described above. As used herein with respect to types of filler material, reference to "first," "second", etc. is for convenience only and does not refer to order of addition to the filler package or the like.

Optionally, as discussed in more detail below, the filler package also may comprise particles of thermally conductive, electrically conductive filler material (referred to herein as "TC/EC" filler material) and/or particles of non-thermally conductive, electrically insulative filler material (referred to herein as "NTC/EI" filler material). The filler materials may be organic or inorganic.

The TC/EC filler material may comprise particles of a single type of filler material or may comprise particles of two or more types of thermally conductive, electrically conductive filler materials. That is, the thermally conductive filler package may comprise particles of a first TC/EC filler material and may further comprise particles of at least a second (i.e., a second, a third, a fourth, etc.) TC/EC filler material that is different from the first TC/EC filler material. In an example, the particles of the first TC/EC filler material may have an average particle size that is at least one order of magnitude greater than an average particle size of the particles of the second TC/EC filler material, such as at least two orders of magnitude greater, such as at least three orders of magnitude greater, wherein the particle sizes may be measured, for example, using a SEM as described above.

Likewise, the NTC/EI filler material may comprise particles of a single type of filler material or may comprise a particle of two or more types of NTC/EI filler materials. That is, the thermally conductive filler package may comprise particles of a first NTC/EI filler material and may further comprise particles of at least a second (i.e., a second, a third, a fourth, etc.) NTC/EI filler material that is different from the first NTC/EI filler material. In an example, the particles of the first NTC/EI filler material may have an average particle size that is at least one order of magnitude greater than an average particle size of the particles of the second NTC/EI filler material, such as at least two orders of magnitude greater, such as at least three orders of magnitude greater, wherein the particle sizes may be measured, for example, using a SEM as described above.

Particles of filler material used in the thermally conductive filler package may have a reported Mohs hardness of at least 1 (based on the Mohs Hardness Scale), such as at least 2, such as at least 3, and may have a reported Mohs hardness of no more than 10, such as no more than 8, such as no more than 7. Particles of filler material used in the thermally conductive filler package may have a reported Mohs hardness of 1 to 10, such as 2 to 8, such as 3 to 7.

Particles of filler material used in the thermally conductive filler package may have a reported average particle size in at least one dimension of at least 0.01 μm, as reported by the manufacturer, such as at least 2 μm, such as at least 10 μm, and may have a reported average particle size in at least one dimension of no more than 500 μm as reported by the manufacturer, such as no more than 400 μm, such as no more than 300 μm, such as no more than 100 μm. The particles of filler material used in the thermally conductive filler package may have a reported average particle size in at least one dimension of 0.01 μm to 500 μm as reported by the manufacturer, such as 0.1 μm to 400 μm, such as 2 μm to 300 μm, such as 10 μm to 100 μm. Suitable methods of measuring average particle size include measurement using an instrument such as the Quanta 250 FEG SEM or an equivalent instrument.

Particles of filler material used in the thermally conductive filler package may comprise a plurality of particles each having, for example, a platy, spherical, or modular shape, and agglomerates thereof.

Particles of filler material used in the thermally conductive filler package may be thermally conductive. The particles of thermally conductive filler material may have a thermal conductivity of at least 5 W/m·K at 25° C. (measured according to ASTM D7984), such as at least 18 W/m·K, such as at least 55 W/m·K, and may have a thermal conductivity of no more than 3,000 W/m·K at 25° C., such as no more than 1,400 W/m·K, such as no more than 450 W/m·K. The particles of a thermally conductive filler material may have a thermal conductivity of 5 W/m·K to 3,000 W/m·K at 25° C. (measured according to ASTM D7984), such as 18 W/m·K to 1,400 W/m·K, such as 55 W/m·K to 450 W/m·K.

Particles of filler material used in the thermally conductive filler package may be non-thermally conductive. The particles of non-thermally conductive filler material may have a thermal conductivity of less than 5 W/m·K at 25° C. (measured according to ASTM D7984), such no more than 3 W/m·K, such as no more than 1 W/mK, such as no more than 0.1 W/mK, such as no more than 0.05 W/mK. Thermal conductivity may be measured as described above.

Particles of filler material used in the thermally conductive filler package may be electrically insulative. The particles of electrically insulative filler material may have a volume resistivity of at least 1 Ω·m (measured according to ASTM D257, C611, or B193), such as at least 10 Ω·m, such as at least 100 Ω·m.

Particles of filler material used in the thermally conductive filler package may be electrically conductive. The particles of electrically conductive filler material may have a volume resistivity of less than 1 Ω·m (measured according to ASTM D257, C611, or B193), such as less than 0.1 Ω·m.

The thermally conductive filler package may be present in the composition in an amount of at least 15% by volume based on total volume of the composition, such as at least 30% by volume, and may be present in the composition in an amount of no more than 90% by volume based on total volume of the composition, such as no more than 75% by volume. The thermally conductive filler package may be present in the composition in an amount of 15% by volume to 90% by volume based on total volume of the composition, such as 30% by volume to 75% by volume.

As noted above, the thermally conductive filler package may comprise particles of TC/EI filler material.

Suitable TC/EI filler materials include boron nitride (for example, commercially available as CarboTherm from Saint-Gobain, as CoolFlow and PolarTherm from Momentive, and as hexagonal boron nitride powder available from Panadyne), silicon nitride, or aluminum nitride (for example, commercially available as aluminum nitride powder available from Micron Metals Inc., and as Toyalnite from Toyal), boron arsenide, metal oxides such as aluminum oxide (for example, commercially available as Microgrit from Micro Abrasives, as Nabalox from Nabaltec, as Aeroxide from Evonik, and as Alodur from Imerys), magnesium oxide, beryllium oxide, silicon dioxide, titanium oxide, zinc oxide, nickel oxide, copper oxide, or tin oxide, metal hydroxides such as aluminum trihydrate, aluminum hydroxide or magnesium hydroxide, arsenides such as boron arsenide, carbides such as silicon carbide, minerals such as agate and emery, ceramics such as ceramic microspheres (for example, commercially available from Zeeospheres Ceramics or 3M), silicon carbide, and diamond. These fillers can also be surface modified, such as PYROKISUMA 5301K available from Kyowa Chemical Industry Co., Ltd. These thermally conductive fillers may be used alone or in a combination of two or more.

The TC/EI filler particles may be present in an amount of at least 50% by volume based on total volume of the filler package, such as at least 60% by volume, such as at least 70% by volume, such as at least 80% by volume, such as at least 90% by volume, and may be present in an amount of no more than 100% by volume based on total volume of the filler package, such as no more than 90% by volume, such as no more than 80% by volume. The TC/EI filler particles may be present in an amount of 50% by volume to 100% by volume based on total volume of the filler package, such as 60% by volume to 100% by volume, such as 70% by volume to 100% by volume, such as 80% by volume to 100% by volume, such as 90% by volume to 100% by volume, such as 50% by volume to 90% by volume, such as 60% by volume to 90% by volume, such as 70% by volume to 90% by volume, such as 80% by volume to 90% by volume, such as such as 50% by volume to 80% by volume, such as 60% by volume to 80% by volume, such as 70% by volume to 80% by volume.

As noted above, the thermally conductive filler package may comprise particles of TC/EC filler material.

Suitable TC/EC filler materials include metals such as silver, zinc, copper, gold, or metal coated hollow particles. Carbon compounds such as, graphite (such as Timrex commercially available from Imerys or ThermoCarb commercially available from Asbury Carbons), carbon black (for example, commercially available as Vulcan from Cabot Corporation), carbon fibers (for example, commercially available as milled carbon fiber from Zoltek), graphene and graphenic carbon particles (for example, xGnP graphene nanoplatelets commercially available from XG Sciences, and/or for example, the graphene particles described below), carbonyl iron, copper (such as spheroidal powder commercially available from Sigma Aldrich), zinc (such as Ultrapure commercially available from Purity Zinc Metals and Zinc Dust XL and XLP available from US Zinc), and the like. Examples of "graphenic carbon particles" include carbon particles having structures comprising one or more layers of one-atom-thick planar sheets of sp2-bonded carbon atoms that are densely packed in a honeycomb crystal lattice. The average number of stacked layers may be less than 100, for example, less than 50. The average number of stacked layers may be 30 or less, such as 20 or less, such as 10 or less, such as 5 or less. The graphenic carbon particles may be substantially flat; however, at least a portion of the planar sheets may be substantially curved, curled, creased, or buckled. The particles typically do not have a spheroidal or equiaxed morphology. Suitable graphenic carbon particles are described in U.S. Publication No. 2012/0129980, at paragraphs [0059]-[0065], the cited portion of which is incorporated herein by reference. Other suitable graphenic carbon particles are described in U.S. Pat. No. 9,562,175, at 6:6 to 9:52, the cited portion of which are incorporated herein by reference.

The TC/EC filler particles, if present at all, may be present in an amount of no more than 30% by volume based on total volume of the filler package, such as no more than 29% by volume, such as no more than 25% by volume, such as no more than 20% by volume, and may be present in an amount of at least 0.1% by volume based on total volume of the filler package, such as at least 0.5% by volume, such as at least 10% by volume. The TC/EC filler particles may be present in an amount of 0.1% by volume to 30% by volume based on total volume of the filler package, such as 0.1% by volume to 25% by volume, such as 0.1% by volume to 20% by volume, such as 10% by volume to 29% by volume.

As noted above, the thermally conductive filler package may comprise particles of NTC/EI filler material.

Suitable NTC/EI filler materials include but are not limited to mica, silica, wollastonite, calcium carbonate, glass microspheres, clay, or combinations thereof.

As used herein, the term "mica" generally refers to sheet silicate (phyllosilicate) minerals. The mica may comprise muscovite mica. Muscovite mica comprises a phyllosilicate mineral of aluminum and potassium with the formula $KAl_2(AlSi_3O_{10})(F,OH)_2$ or $(KF)_2(Al_2O_3)_3(SiO_2)_6(H_2O)$. Exemplary non-limiting commercially available muscovite mica include products sold under the trade name DakotaPURE™, such as DakotaPURE™ 700, DakotaPURE™ 1500, DakotaPURE™ 2400, DakotaPURE™ 3000, DakotaPURE™ 3500 and DakotaPURE™ 4000, available from Pacer Minerals.

The silica $(SiO_2)$ may comprise fumed silica which comprises silica that has been treated with a flame to form a three-dimensional structure. The fumed silica may be untreated or surface treated with a siloxane, such as, for example, polydimethylsiloxane. Exemplary non-limiting commercially available fumed silica includes products solder under the trade name AEROSIL®, such as AEROSIL® R 104, AEROSIL® R 106, AEROSIL® R 202, AEROSIL® R 208, AEROSIL® R 972 commercially available from Evonik Industries and products sold under the trade name HDK® such as HDK® H17 and HDK® H18 commercially available from Wacker Chemie AG.

Wollastonite comprises a calcium inosilicate mineral (CaSiO_3) that may contain small amounts of iron, aluminum, magnesium, manganese, titanium and/or potassium. The wollastonite may have a B.E.T. surface area of 1.5 to 2.1 $m^2/g$, such as 1.8 $m^2/g$ and a median particle size of 6 microns to 10 microns, such as 8 microns. Non-limiting examples of commercially available wollastonite include NYAD 400 available from NYCO Minerals, Inc.

The calcium carbonate $(CaCO_3)$ may comprise a precipitated calcium carbonate or a ground calcium carbonate. The calcium carbonate may or may not be surface treated with stearic acid. Non-limiting examples of commercially available precipitated calcium carbonate include Ultra-Pflex®, Albafil®, and Albacar HO® available from Specialty Minerals and Winnofil® SPT available from Solvay. Non-limiting examples of commercially available ground calcium carbonate include Duramite™ available from IMERYS and Marblewhite® available from Specialty Minerals.

Useful clay minerals include a non-ionic platy filler such as talc, pyrophyllite, chlorite, vermiculite, or combinations thereof.

The glass microspheres may be hollow borosilicate glass. Non-limiting examples of commercially available glass microspheres include 3M Glass bubbles type VS, K series, and S series available from 3M.

The NTC/EI filler particles, if present at all, may be present in an amount of no more than 10% by volume based on total volume of the filler package, such as no more than 5% by volume, such as no more than 1% by volume, and may be present in an amount of at least 0.1% by volume based on total volume of the filler package, such as at least 0.5% by volume. The NTC/EI filler particles may be present in an amount of 0.1% by volume to 10% by volume based on total volume of the filler package, such as 0.5% by volume to 5% by volume, such as 0.5% by volume to 1% by volume.

The composition may comprise a reactive diluent. The reactive diluent may be a monomer or a polymer, and may be mono-functional, bi-functional, or multi-functional. The reactive diluent, in some instances, may be an adhesion promoter or a surface-active agent. Suitable examples of reactive diluent include 1,4-butanediol diglycidyl ether (available as Heloxy modifier BD from Hexion), 1,6-hexanediol diglycidyl ether, mono-functional aliphatic diluents (Epotec RD 108, RD 109, RD 188 available from Aditya Birla), and mono-functional aromatic reactive diluents (Epotec RD 104, RD 105, and RD 136 available from Aditya Birla). Other suitable examples of the reactive diluent include saturated epoxidized oils, unsaturated oils such as glycerides of polyunsaturated fatty acids such as nut oils or seed oils, including as examples cashew nut oil, sunflower oil, safflower oil, soybean oil, linseed oil, castor oil, orange oil, rapeseed oil, tall oil, vegetable processing oil, vulcanized vegetable oil, high oleic acid sunflower oil, tung oil, and combinations thereof. The reactive diluent of the present invention also may be homopolymers of 1,2-butadiene or 1,4-butadiene or combinations thereof, copolymers of butadiene and acrylic or olefin monomers, or combinations thereof.

The reactive diluent may have a boiling point of greater than 100° C., such as greater than 130° C., such as greater than 150° C., for example, and the reactive diluent may have a boiling point of less than 425° C., such as less than 390° C., such as less than 360° C., for example.

The reactive diluent can lower the viscosity of the mixture. According to the present invention, the reactive diluent may have a viscosity of from 1 mPa·s to 4,000 mPa·s at 25° C. according to ASTM D789, such as for example, from 1 mPa·s to 3,000 mPa·s, 1 mPa·s to 2,000 mPa·s, 1 mPa·s to 1,000 mPa·s, 1 mPa·s to 100 mPa·s, or 2 mPa·s to 30 mPa·s.

Any accelerator capable of accelerating a reaction of the thiol-terminated compound and the oxidant may be used in the present invention. Suitable accelerators that may be used in accordance with the present invention thus include for example thiazoles, thiurams, sulfenamides, guanidines, dithiocarbamates, xanthates, thioureas, aldehydeamines, and combinations of any of the foregoing. Examples of suitable thiazoles include bis(2-benzothiazole) disulfide (MBTS), 2-mercaptobenzothiazole (MBT), and the zinc salt of mercaptobenzothiazole (ZMBT). Examples of suitable thiurams include tetramethyl thiuram monosulfide, tetramethyl thiuram disulfide (TMTD), tetraethyl thiuram disulfide, tetrabutyl thiuram disulfide, dipentamethylene thiuram hexasulfide, dicyclohexamethylene thiuram disulfide, diisopropyl thiuram disulfide, bis(morpholinothiocarbonyl) sulfide, tetramethyl thiuram monosulfide (TMTM), dipentamethylene thiuram tetrasulfide (DPTT), and compounds having the structure $(R)_2N—C(=S)—S_x—C(=S)—N(R)_2$ where each R can be $C_{1-6}$ alkyl and x is an integer from 1 to 4, and combinations of any of the foregoing. Examples of suitable sulfonamides include N-cyclohexyl-2-benzothiazolsulfenamide, tertbutyl-2-benzothiazolsulfenamide (TBBS), dicyclohexyl-2-benzothiazolsulfenamide (DCBS), and combinations of any of the foregoing. Examples of suitable guanidines include diphenyl guanidine (DPG), N,N'-di-orthotolyl guanidine (DOTG), compounds having the structure R—NH—C(=NH)—NH—R where each R is selected from $C_{1-6}$ alkyl, phenyl and toluoyl, and combinations of any of the foregoing. Examples of suitable dithiocarbamates include zinc dialkyl dithiocarbamates such as dimethyl-dithiocarbamate (ZDMC), diethyl-dithiocarbamate (ZDEC) and dibutyl-dithiocarbamate (ZDBC), other metal or ammonium salts of dithiocarbamoic acid, compounds having the structure $Zn(—S—C(=S)—N(R)_2)$ where each R is selected from $C_{1-6}$ alkyl, phenyl and toluoyl, and combinations of any of the foregoing. Examples of suitable xanthates include zinc salts of xanthic acid. Examples of suitable thioureas include ethylene thiourea (ETU), dipentamethylene thiourea (DPTU), dibutyl thiourea (DBTU), and compounds having the structure R—NH—C(=S)—NH—R where each R is selected from $C_{1-6}$ alkyl, phenyl and toluoyl, and combinations of any of the foregoing. Examples of suitable aldehydeamines include condensation products of aldehydes and amines, such as aniline, ammoniac or their derivatives and also butyraldehyde, crotonylaldehyde or formaldehyde such as butyraldehydeaniline and tricrotonylidenetetramine, and combinations of any of the foregoing. Examples of other suitable cure accelerators include triazines and sulfides or metallic and amine salts of dialkyl-dithiophosphoric acids and dithiophosphates such as triazines and sulfides or metallic and amine salts of dialkyldithiophosphoric acids, and combinations of any of the foregoing. Examples of non-sulfur-containing polysulfide cure accelerators include tetramethyl guanidine (TMG), di-o-tolyl guanidine (DOTG), sodium hydroxide (NaOH), water, and amines. Examples of amines include quaternary amines, tertiary amines, cyclic tertiary amines, or secondary amines.

The accelerator may be present in the composition in an amount of at least 0.01% by volume based on the total volume of the thiol-terminated compound, oxidant, and accelerator, such as at least 0.02% by volume, such as at least 0.03% by volume, and may be present in an amount of no more than 30% by volume based on the total volume of the thiol-terminated compound, oxidant, and accelerator, such as no more than 20% by volume, such as no more than 10% by volume. The accelerator may be present in the composition in an amount of 0.01% to 30% by volume based on the total volume of the thiol-terminated compound, oxidant, and accelerator, such as 0.02% to 20% by volume, such as 0.03% to 10% by volume.

The composition optionally may further comprise a dispersant. As used herein, the term "dispersant" refers to a substance that may be added to the composition in order to improve the separation of the thermally conductive filler particles by wetting the particles and breaking apart agglomerates. The dispersant, if present at all, may be present in the composition in an amount of at least 0.05% by volume based on total volume of the thermally conductive filler package, such as at least 0.2% by volume, and may be present in an amount of no more than 20% by volume based on total volume of the thermally conductive filler package, such as no more than 10% by volume, such as no more than 3% by volume, such as no more than 1% by volume. The dispersant, if present at all, may be present in the composition in an amount of 0.05% by volume to 20% by volume based on total volume of the thermally conductive filler package, such as 0.2% by volume to 10% by volume, such as 0.2% by volume to 3% by volume, such as 0.2% by volume to 1% by volume. Suitable dispersants for use in the composition include fatty acid, phosphoric acid esters, polyurethanes, polyamines, polyacrylates, polyalkoxylates, sulfonates, polyethers, and polyesters, or any combination thereof. Non-limiting examples of commercially available dispersants include ANTI-TERRA-U100, DISPERBYK-102, DISPERBYK-103, DISPERBYK-111, DISPERBYK-171, DISPERBYK-2151, DISPERBYK-2059, DISPERBYK-2000, DISPERBYK-2117, and DISPERBYK-2118 available from BYK Company; and SOLSPERSE 24000SC, SOLSPERSE 16000 and SOLSPERSE 8000 hyperdispersants available from The Lubrizol Corporation.

The composition may optionally comprise a rheology modifier, a tackifier, a thermoplastic polymer, a thixotrope, a colorant, a flame retardant, a corrosion inhibitor, a UV stabilizer, a tint and/or other materials.

Examples of suitable corrosion inhibitors include, for example, zinc phosphate-based corrosion inhibitors, for example, micronized Halox® SZP-391, Halox® 430 calcium phosphate, Halox® ZP zinc phosphate, Halox® SW-111 strontium phosphosilicate Halox® 720 mixed metal phosphor-carbonate, and Halox® 550 and 650 proprietary organic corrosion inhibitors commercially available from Halox. Other suitable corrosion inhibitors include Heucophos® ZPA zinc aluminum phosphate and Heucophos® ZMP zinc molybdenum phosphate, commercially available from Heucotech Ltd.

A corrosion inhibitor can comprise a lithium silicate such as lithium orthosilicate ($Li_4SiO_4$) and lithium metasilicate ($Li_2SiO_3$), MgO, an azole, or a combination of any of the foregoing. The corrosion inhibiting component (2) may further comprise at least one of magnesium oxide (MgO) and an azole.

A corrosion inhibitor can comprise a monomeric amino acid, a dimeric amino acid, an oligomeric amino acid, or a combination of any of the foregoing. Examples of suitable amino acids include histidine, arginine, lysine, cysteine, cystine, tryptophan, methionine, phenylalanine, tyrosine, and combinations of any of the foregoing.

A corrosion inhibitor can comprise a nitrogen-containing heterocyclic compound. Examples of such compounds include azoles, oxazoles, thiazoles, thiazolines, imidazoles, diazoles, pyridines, indolizines, and triazines, tetrazoles, tolyltriazole, and combinations of any of the foregoing.

Examples of suitable triazoles include 1,2,3-triazole, 1,2,4-triazole, benzotriazole, derivatives thereof, and combinations of any of the foregoing. Derivatives of 1,2,3-triazole include 1-methyl-1,2,3-triazole, 1-phenyl-1,2,3-triazole, 4-methyl-2-phenyl-1,2,3-triazole, 1-benzyl-1,2,3-triazole, 4-hydroxy-1,2,3-triazole, 1-amino-1,2,3-triazole, 1-benzamido-4-methyl-1,2,3-triazole, 1-amino-4,5-diphenyl-1,2,3-triazole, 1,2,3-triazole aldehyde, 2-methyl-1,2,3-triazole-4-carboxylic acid, and 4-cyano-1,2,3-triazole, or combinations thereof. Derivatives of 1,2,4-triazole include 1-methyl-1,2,4-triazole, 1,3-diphenyl-1,2,4-triazole, 5-amino-3-methyl-1,2,4-triazole, 3-mercapto-1,2,4-triazole, 1,2,4-triazole-3-carboxylic acid, 1-phenyl-1,2,4-triazole-5-one, 1-phenylurazole, and combinations of any of the foregoing. Examples of diazoles include 2,5-dimercapto-1,3,4-thiadiazole.

A corrosion inhibitor can include an azole or combination of azoles. Azoles are 5-membered N-heterocyclic compounds that contain in the heterocyclic ring two double bonds, one to three carbon atoms and optionally a sulfur or oxygen atom. Examples of suitable azoles include benzotriazole, 5-methyl benzotriazole, tolyltriazole, 2,5-dimercapto-1,3,4-thiazole, 2-mercaptobenzothiazole, 2-mercaptobenzimidazole, 1-phenyl-5-mercaptotetrazole, 2-amino-5-mercapto-1,3,4-thiadiazole, 2-mercapto-1-methylimidazole, 2-amino-5-ethyl-1,3,4-thiadiazole, 2-amino-5-ethylthio-1,3,4-thiadiazole, 5-phenyltetrazole, 7H-imidazo (4,5-d)pyrimidine, and 2-amino thiazole. Salts of any of the foregoing, such as sodium and/or zinc salts, can also be used as effective corrosion inhibitors. Other suitable azoles include 2-hydroxybenzothiazole, benzothiazole, 1-phenyl-4-methylimidazole, and 1-(p-tolyl)-4-methlyimidazole.

Compositions provided by the present disclosure can comprise corrosion resistant particles such as inorganic oxide particles, including for example, cerium oxide ($CeO_2$), molybdenum oxide ($MoO_3$), and combinations of any of the foregoing. An inorganic oxide can comprise an oxide of cerium, yttrium, molybdenum, lithium, tin, calcium, boron, phosphorous, zirconium, iron, titanium, or a combination of any of the forgoing. In certain examples, the particles comprise an oxide of cerium or calcium. Additionally, the thermally conductive, electrically insulative filler particles described above may, in certain examples, provide corrosion resistance.

Compositions provided by the present disclosure can comprise a flame retardant or combination of flame retardants. As used herein, "flame retardant" refers to a material that slows down or stops the spread of fire or reduces its intensity. Flame retardants may be available as a powder that may be mixed with a composition, a foam, or a gel. In examples, when the compositions of the present invention include a flame retardant, such compositions may form a coating on a substrate surface and such coating may function as a flame retardant.

As set forth in more detail below, a flame retardant can include a mineral, an organic, an organohalogen, an organophosphorous, or a combination thereof.

Suitable examples of minerals include aluminum hydroxide (ATH), magnesium hydroxide (MDH), huntite, hydromagnesite, various hydrates, red phosphorous, boron compounds such as borates, carbonates such as calcium carbonate and magnesium carbonate, and combinations thereof.

Suitable examples of organohalogen compounds include organochlorines such as chlorendic acid derivatives and chlorinated paraffins; organobromines such as decabromodiphenyl ether (decaBDE), decabromodiphenyl ethane (a replacement for decaBDE), polymeric brominated compounds such as brominated polystyrenes, brominated carbonate oligomers (BCOs), brominated epoxy oligomers (BEOs), tetrabromophthalic anyhydride, tetrabromobisphenol A (TBBPA) and hexabromocyclododecane (HBCD). Such halogenated flame retardants may be used in conjunction with a synergist to enhance their efficiency. Other suitable examples include antimony trioxide, antimony pentaoxide, and sodium antimonate.

Suitable examples of organophosphorous compounds include triphenyl phosphate (TPP), resorcinol bis(diphenylphosphate) (RDP), bisphenol A diphenyl phosphate (BADP), and tricresyl phosphate (TCP); phosphonates such as dimethyl methylphosphonate (DMMP); and phosphinates such as aluminium diethyl phosphinate. In one important class of flame retardants, compounds contain both phosphorus and a halogen. Such compounds include tris(2,3-dibromopropyl) phosphate (brominated tris) and chlorinated organophosphates such as tris(1,3-dichloro-2-propyl)phosphate (chlorinated tris or TDCPP) and tetrakis(2-chlorethyl) dichloroisopentyldiphosphate (V6).

Suitable examples of organic compounds include carboxylic acid, dicarboxylic acid, melamine, and organonitrigen compounds.

Other suitable flame retardants include ammonium polyphosphate and barium sulfate.

The thixotrope may be present in the composition in an amount of at least 0.01% by volume based on total volume of the composition, such as at least 0.2% by volume, and in some instances may be present in the composition in an amount of no more than 5% by volume based on total volume of the composition, such as no more than 3% by volume, such as no more than 1% by volume. The thixotrope may be present in the composition in an amount of 0.01% by volume to 5% by volume based on total volume of the composition, such as 0.2% by volume to 3% by volume, such as 0.2% by volume to 1% by volume. Useful thixotropes that may be used include polyamide, polyether phosphate, oxidized polyolefin, Castor wax and organoclay. Commercially available thixotropes useful in the present invention include Disparlon 6500 available from King Industries, Garamite 1958 available from BYK Company, Bentone SD2 and Thxatrol®ST available from Elementis, and Crayvallac SLX available from Arkema. Useful colorants or tints may include phthalocyanine blue.

The composition optionally may comprise at least one plasticizer. Examples of plasticizers include diisononylphthalate (Jayflex™ DINP available from Exxon Mobil), diisodecylphthalate (Jayflex™ DIDP available from Exxon Mobil), and alkyl benzyl phthalate (Santicizer 278 available from Valtris); benzoate-based plasticizers such as dipropylene glycol dibenzoate (K-Flex® available from Emerald Performance Materials); and other plasticizers including terephthalate-based dioctyl terephthalate (DEHT available from Eastman Chemical Company), alkylsulfonic acid ester of phenol (Mesamoll available from Borchers), and 1,2-cyclohexane dicarboxylic acid diisononyl ester (Hexamoll DINCH available from BASF). Other plasticizers may include isophthalic hydrogenated terphenyls, quarterphenyls and higher or polyphenyls, phthalate esters, chlorinated paraffins, modified polyphenyl, tung oil, naphthalene sulfonates, trimellitates, adipates, sebacates, maleates, sulfonamide, organophosphates, polybutene, and combinations of any of the foregoing. These plasticizers can be polymers such as polyacrylates.

The plasticizer may be present in the composition in an amount of at least 0.5% by volume based on the total volume of the thiol-terminated compound, oxide, and plasticizer, such as at least 2% by volume, such as at least 3% by volume, and may be present in an amount of no more than 30% by volume based on total volume of the thiol-terminated compound, oxide, and plasticizer, such as no more than 20% by volume, such as no more than 16% by volume. The plasticizer may be present in the composition in an amount of 0.5% to 30% by volume based on total weight of the thiol-terminated compound, oxide, and plasticizer, such as 2% to 20% by volume, such as 3% to 16% by volume.

The composition also may comprise a solvent. Suitable solvents include toluene, methyl ethyl ketone, benzene, n-hexane, xylene, and combinations thereof.

The solvent may be present in the composition in an amount of at least 1% by volume based on the total volume of the composition, such as at least 2% by volume, such as at least 5% by volume, and may be present in an amount of no more than 60% by volume, such as no more than 40% by volume, such as no more than 20% by volume. The solvent may be present in the composition in an amount of 1% to 60% by volume based on total volume of the composition, such as 2% to 40% by volume, such as 5% to 20% by volume.

The composition according to the present invention optionally may further comprise an adhesion promoter, antioxidant, water scavenger, and the like, in amounts known to those skilled in the art.

Optionally, the compositions disclosed herein may be substantially free, or essentially free, or completely free, of epoxy-containing compounds. As used herein, a composition is "substantially free" of an epoxy-containing compound if the epoxy-containing compound is present in an amount of less than 0.001% by weight of the total weight of the composition. As used herein, a composition is "essentially free" of an epoxy-containing compound if the epoxy-containing compound is present in an amount of less than 0.0005% by weight of the total weight of the composition. As used herein, a composition is "completely free" of an epoxy-containing compound if the epoxy-containing compound is not present in the composition, i.e., 0.0000% by weight.

The composition of the present invention may comprise, or consist essentially of, or consist of, a thiol-terminated compound, an oxidant, and a thermally conductive filler package as described above, and optionally an accelerator and/or a dispersant. As used herein, the composition "consists essentially of" a thiol-terminated compound, an oxidant, a thermally conductive filler package as described above, and optionally an accelerator and/or a dispersant, when the maximum amount of other components is 5% by volume or less based on total volume of the composition.

The compositions disclosed herein may be 1K compositions comprising, or consisting essentially of, or consisting of, a thiol-terminated compound, an oxidant, and a thermally conductive filler package, and optionally an accelerator and/or a dispersant and/or any of the additives described hereinabove.

In examples, the compositions of the present invention may be provided as pre-mixed frozen compositions (PMF). PMFs may be cured by external factors, such as temperature. In examples, the PMF may be stored at temperatures between and including −100° C. and −15° C., such as −100° C. to −25° C., to retard hardening, such as at a minimum of −75° C., such as at a maximum of −40° C. When applying the composition to the substrate, the composition may can be exposed to temperatures sufficient to at least partially cure the composition.

In the examples described above, the composition may be at least partially cured by the addition of heat. In another non-limiting example, the composition may be at least partially cured by oxidation. The term "inhibiting" refers to restraining, impeding, slowing or interfering with a particular reaction or function. This can be accomplished in a number of ways, for example, controlling the environment to which the composition is exposed. In the case of oxidation, inhibiting refers to restraining, impeding, slowing or interfering with the oxidation of the thiol-terminated compound. In a non-limiting example, oxidation is at least partially inhibited by limiting the composition's exposure to air or ambient conditions.

PMFs may be packaged, for example, in a cartridge, a cartridge and plunger, a syringe, or may be supplied as a tape, a cap, or any pre-formed geometry.

The compositions disclosed herein may be 1K compositions comprising, or consisting essentially of, or consisting of, a thiol-terminated compound, an oxidant, and a thermally conductive filler package, and optionally an accelerator and/or a dispersant and/or any of the additives described herein above. It has been surprisingly discovered that the 1K coating compositions of the present invention are workable for at least 10 days, such as at least 20 days, such as at least 30 days, when stored at ambient conditions. It also has been surprising discovered that the PMF compositions of the present invention are workable for at least 10 days, such as at least 20 days, such as at least 30 days, when thawed and stored at ambient conditions.

The compositions disclosed herein may be 2K compositions comprising, or consisting essentially of, or consisting of, a first component comprising, or consisting essentially of, or consisting of, a thiol-terminated compound, a second component comprising, or consisting essentially of, or consisting of, a oxidant, and a thermally conductive filler package that may be present in the first component and/or the second component, and optionally an accelerator and/or a dispersant and/or any of the additives described herein above may be present in the first component and/or the second component. The first and second components are mixed together immediately prior to use.

The compositions disclosed herein may be 3K or higher compositions comprising, or consisting essentially of, or consisting of, a first component comprising, or consisting essentially of, or consisting of, a thiol-terminated compound, a second component comprising, or consisting essentially of, or consisting of, an oxidant, and a third component comprising, or consisting essentially of, or consisting of, a thermally conductive filler package, and optionally an accelerator and/or a dispersant and/or any of the additives described herein above may be present in the first component and/or the second component and/or the third component.

The composition may have a total solids content of at least 40% by volume based on total volume of the composition, such as at least 60%, such as at least 80% by volume, and may have a total solids content of no more than 100% by volume based on total volume of the composition. The composition may have a total solids content of 40% to 100% by volume based on total volume of the composition, such as 60% to 100% by volume, such as 80% to 100% by volume. As used herein, "total solids" refers to the non-volatile content of the composition, i.e., materials which will not volatilize when heated to 110° C. and standard atmospheric pressure (101325 Pa) for 60 minutes.

In the case of a 2K composition, one of the components may be substantially free, or essentially free, or completely free, of filler materials, and in the case of a 3K composition, one or two of the components may be substantially free, or essentially free, or completely free, of filler materials.

The composition may be a low-VOC composition. As used herein, the term "low-VOC" refers to a composition having a theoretical VOC volume % of less than 7% by volume, such as less than 3% by volume, such as less than 2% by volume, based on total volume of the composition.

The theoretical volatile organic content ("VOC") may be less than 105 g/L, such as less than 75 g/L, such as less than 30 g/L. As used herein, VOC volume %

$$= \frac{\text{Sum of the volume of all } VOC \text{ compounds}}{\text{Total Formula volume}}, \text{ and}$$

$$VOC(\text{g/L}) = \frac{VOC\% \text{ vol}}{100} * \text{Formula}$$

$$\text{Density}(\text{lb./Gallon}) * 453.592(\text{g/lb.}) * \frac{1}{3.78541 \text{Liters/Gallon}}.$$

The present invention may also be a method for preparing a composition comprising, or in some cases consisting of, or in some cases consisting essentially of, a thiol-terminated compound, an oxidant that reacts with the thiol-terminated compound, a thermally conductive filler package, and optionally an accelerator, and optionally a dispersant, and any of the optional further components, if used, described above, the method comprising, or in some cases consisting of, or in some cases consisting essentially of, mixing a thiol-terminated compound, an oxidant, a thermally conductive filler package, and optionally an accelerator, and optionally a dispersant and the optional component(s), if used, at a temperature of less than 50° C., such as from 0° C. to 50° C., such as from 15° C. to 35° C., such as at ambient temperature.

The composition described above may be applied alone or as part of a system that can be deposited in a number of different ways onto a number of different substrates. The system may comprise a number of the same or different films, coatings, or layers. A film, coating, or layer is typically formed when a composition that is deposited onto at least a portion of the substrate surface is at least partially dried or cured by methods known to those of ordinary skill in the art (e.g., under ambient conditions or by exposure to thermal heating).

The composition can be applied to the surface of a substrate in any number of different ways, non-limiting examples of which include brushes, rollers, films, pellets, trowels, spatulas, dips, spray guns, applicator guns, and pneumatic guns to form a coating on at least a portion of the substrate surface.

After application to the substrate(s), the composition may be cured. For example, the composition may be allowed to cure at room temperature or slightly thermal conditions and/or the composition may be cured by baking and/or curing at elevated temperature, such as at a temperature of 180° C. or below, such as 130° C. or below, such as 110° C. or below, such as 100° C. or below, such as 90° C. or below, such as 80° C. or below, such as 70° C. or below, but greater than ambient, such as greater than 40° C., such as greater than 50° C., and for any desired time period (e.g., from 5 minutes to 24 hours) sufficient to at least partially cure the composition on the substrate(s). Alternatively, the composition of the present invention may cure at ambient or slightly above ambient conditions.

The present invention also is directed to a method for treating a substrate comprising, or consisting essentially of, or consisting of, contacting at least a portion of a surface of the substrate with one of the compositions of the present invention described hereinabove. The composition may be cured to form a coating, layer or film on the substrate surface under ambient conditions or by exposure to an external energy source, for example such as by heating the substrate to a temperature of less than 180° C., such as less than 130°

C., such as less than 90° C. The coating, layer or film, may be, for example, a sealant, potting compound, a gap filler, or an adhesive.

The present invention is also directed to a method for forming a bond between two substrates for a wide variety of potential applications in which the bond between the substrates provides particular mechanical properties related to lap shear strength. The method may comprise, or consist essentially of, or consist of, applying the composition described above to a first substrate; contacting a second substrate to the composition such that the composition is located between the first substrate and the second substrate; and curing the composition under ambient conditions or by exposure to an external energy source, for example such as by heating to a temperature of less than 180° C., such as less than 130° C., such as less than 90° C. For example, the composition may be applied to either one or both of the substrate materials being bonded to form an adhesive bond therebetween and the substrates may be aligned and pressure and/or spacers may be added to control bond thickness. The composition may be applied to cleaned or uncleaned (i.e., including oily or oiled) substrate surfaces.

As stated above, the composition of the present disclosure also may form a sealant on a substrate or a substrate surface. The sealant composition may be applied to substrate surfaces, including, by way of non-limiting example, a vehicle body or components of an automobile frame or an airplane. The sealant formed by the composition of the present invention provides sufficient sound damping, tensile strength and tensile elongation. The sealant composition may be applied to cleaned or uncleaned (i.e., including oily or oiled) substrate surfaces. It may also be applied to a substrate that has been pretreated, coated with an electrode-positable coating, coated with additional layers such as a primer, basecoat, or topcoat. The coating composition may dry or cure at ambient conditions once applied to a substrate or substrates coated with coating compositions may optionally subsequently be baked in an oven to cure the coating composition.

The composition may be injected or otherwise placed in a die caster or a mold and at least partially dried or cured under ambient conditions or by exposure to an external energy source, for example such as by heating to a temperature of less than 180° C., such as less than 130° C., such as less than 90° C. to form a part or a member and optionally may be machined to a particular configuration.

The composition of the present invention, in an at least partially dried or cured state (i.e., a layer, coating, or film), surprisingly may demonstrate at least one of the following:

(a) a thermal conductivity of at least 0.4 W/m·K (measured according to ASTM D7984), such as at least 0.5 W/m·K, such as at least 0.7 W/m·K;

(b) a dielectric strength of at least 1 kV/mm measured according to ASTM D149 on a dielectric meter (Sefetec RMG12AC-DC) connected to two copper electrodes with 1 inch diameter, such as at least 1.5 kV/mm;

(c) a shore A hardness of at least 5 measured according to ASTM D2240 with a Type A durometer (Model 2000, Rex Gauge Company, Inc.) at room temperature, such as at least 10, such as at least 20, such as at least 30, such as at least 40, such as 5 to 95;

(d) a 180° peel strength of at least 1 lbf/in (measured according to SAE AS5127/1B with an Instron universal testing machine, model 3345), such as at least 2 lbf/in, such as at least 3 lbf/in, such as at least 4 lbf/in;

(e) a tensile stress at break of at least 1 MPa as determined according to ISO 37-2 using an Instron universal testing machine, model 3345 with a pull rate of 2 inches/min, such as at least 10 MPa, such as at least 25 MPa, such as at least 30 MPa, such as 1 MPa to 100 MPa;

(f) an elongation of 1% to 900%, as determined according to ISO 37-2 using an Instron universal testing machine, model 3345 with a pull rate of 2 inches/min, such as at least 100%, such as at least 200%, such as at least 300%, such as at least 400%, such as at least 500%, such as at least 600%, such as at least 700%, such as at least 800%, such as at least 900%; and/or (g) a Young's modulus of 0.01 MPa to 100 MPa, as determined according to ISO 37-2 using an Instron universal testing machine, model 3345 with a pull rate of 2 inches/min, such as at least 100 psi, such as at least 0.1 MPa, such as at least 1 MPa, such as at least 10 MPa.

The substrates that may be coated by the compositions of the present invention are not limited. Suitable substrates useful in the present invention include, but are not limited to, materials such as metals or metal alloys, polymeric materials such as hard plastics including filled and unfilled thermoplastic materials or thermoset materials, or composite materials. For example, suitable substrates include rigid metal substrates such as ferrous metals, aluminum, aluminum alloys, magnesium titanium, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Aluminum alloys of the 1XXX, 2XXX, 3XXX, 4XXX, 5XXX, 6XXX, 7XXX, or 8XXX series as well as clad aluminum alloys and cast aluminum alloys of the A356, 1XX.X, 2XX.X, 3XX.X, 4XX.X, 5XX.X, 6XX.X, 7XX.X, or 8XX.X series also may be used as the substrate. Magnesium alloys of the AZ31B, AZ91C, AM60B, or EV31A series also may be used as the substrate. The substrate used in the present invention may also comprise titanium and/or titanium alloys of grades 1-36 including H grade variants. Other suitable non-ferrous metals include copper and magnesium, as well as alloys of these materials. In examples, the substrate may be a multi-metal article. As used herein, the term "multi-metal article" refers to (1) an article that has at least one surface comprised of a first metal and at least one surface comprised of a second metal that is different from the first metal, (2) a first article that has at least one surface comprised of a first metal and a second article that has at least one surface comprised of a second metal that is different from the first metal, or (3) both (1) and (2). Suitable metal substrates for use in the present invention include those that are used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, and industrial structures and components. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091. It will be understood the substrate may also be anodized, primed, organic-coated or chromate-coated. Other substrates may comprise epoxy, urethane, graphite, Kevlar®, acrylics, polycarbonates, a composite material such as a plastic or a fiberglass composite. The substrate may be a fiberglass and/or carbon fiber composite. The compositions of the present invention are particularly suitable for use in various industrial or transportation applications including automotive, light and heavy commercial vehicles, marine, or aerospace.

Figure 2:
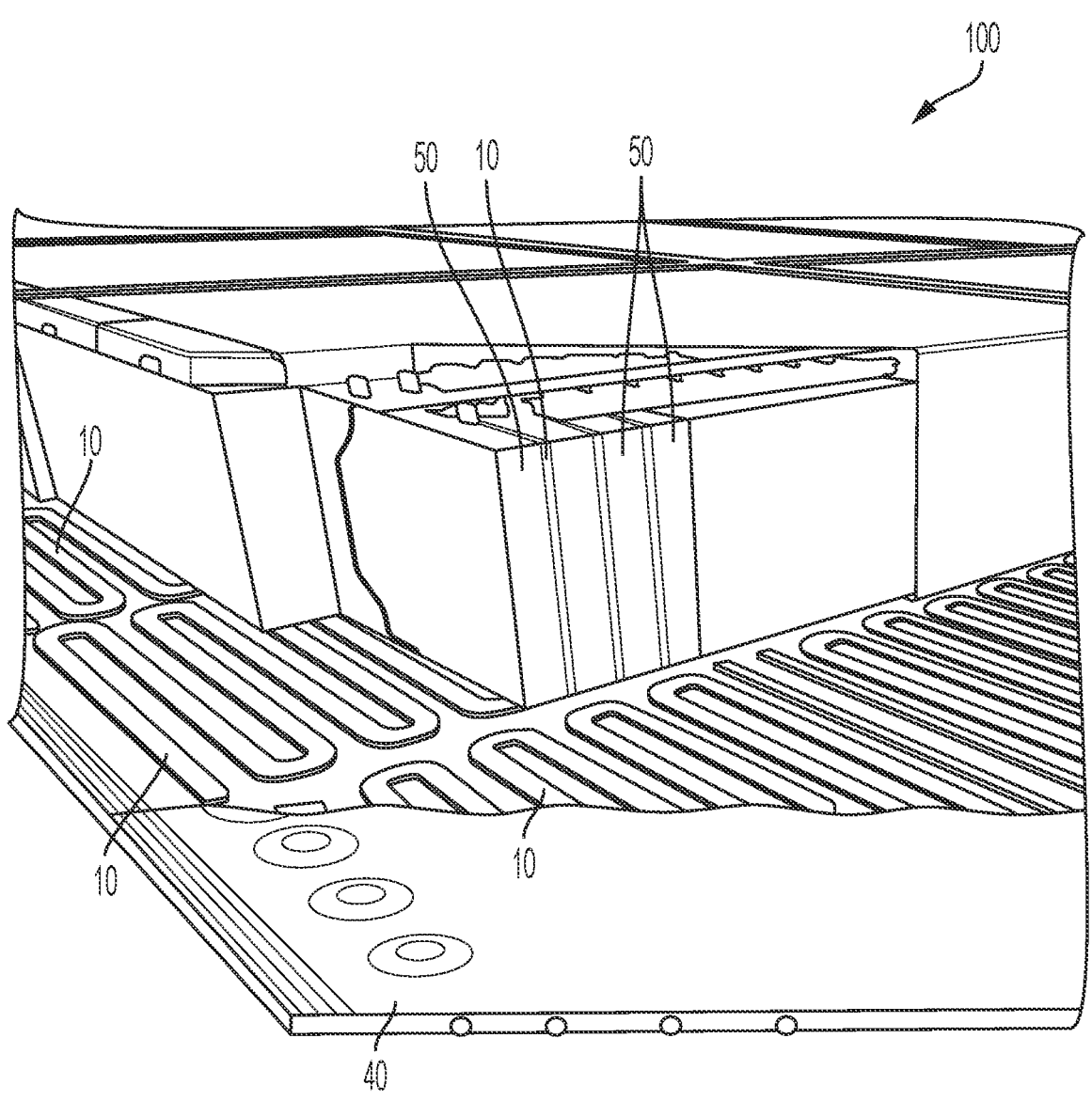

FIGS. 1 and 2 are schematic perspective views illustrating a thermally conductive member utilized as a gap filler in a battery pack 100. As illustrated in FIG. 1, the thermally conductive matter 10 (formed from the compositions described herein in an at least partially cured state) is positioned between two battery cells/battery modules 50 which are interconnected in series or in parallel by inter-connects (not shown). In other examples (FIG. 1), the thermally conductive matter may be positioned between cooling fin 30 and/or a battery cell/battery module 50, between battery modules 50, between a between a battery cell/battery module 50 and a surface of a wall of a battery box 20 or may be applied as a coating on at least a portion of the substrate of a wall of a battery box 20. As shown in FIG. 2, the thermally conductive matter 10 may be positioned between a cooling plate 40 and a battery cell/battery module 50. The battery pack may further comprise a thermal management system (not shown) comprising air or fluid circuits, which may be liquid based (for example glycol solutions) or direct refrigerant based.

Alternatively, the composition may be casted, extruded, molded, or machined to form a part or a member in at least partially dried or cured state.

The 2K compositions disclosed herein surprisingly may be used in any suitable additive manufacturing technology, such as extrusion, jetting, and binder jetting.

The present disclosure is directed to the production of structural articles, such as by way of non-limiting example, sound damping pads, using three-dimensional printing. A three-dimensional article may be produced by forming successive portions or layers of an article by depositing the composition of the present invention onto a substrate and thereafter depositing additional portions or layers of the composition over the underlying deposited portion or layer and/or adjacent the previously deposited portion or layer. Layers can be successively deposited adjacent a previously deposited layer to build a printed article. First and second components of the composition can be mixed and then deposited or the first and second components of the composition can be deposited separately. When deposited separately, the first and second components can be deposited simultaneously, sequentially, or both simultaneously and sequentially.

By "portions of an article" is meant subunits of an article, such as layers of an article. The layers may be on successive horizontal parallel planes. The portions may be parallel planes of the deposited material or beads of the deposited material produced as discreet droplets or as a continuous stream of material. The first and second components may each be provided neat or may also include an organic solvent and/or other additives as described below. First and second components provided by the present disclosure may be substantially free of solvent. By substantially free is meant that the first and second components comprise less than 5% by volume, less than 4% by volume, less than 2% by volume, or less than 1% by volume of solvent, where % by volume is based on the total volume of the first component or the second component, as the case may be. Similarly, the composition provided by the present disclosure may be substantially free of solvent, such as having less than 5% by volume, less than 4% by volume, less than 2% by volume, or less than 1% by volume of solvent, where % by volume is based on the total volume of the composition.

The first and second components may be mixed together and subsequently deposited as a mixture of components that react to form portions of an article. For example, two components may be mixed together and deposited as a mixture of components that react to form a thermoset by delivery of at least two separate streams of the components into a mixer such as a static mixer and/or a dynamic mixer to produce a single stream that is then deposited. The components may be at least partially reacted by the time a composition comprising the reaction mixture is deposited. The deposited reaction mixture may react at least in part after deposition and may also react with previously deposited portions and/or subsequently deposited portions of the article such as underlying layers or overlying layers of the article.

Two or more components can be deposited using any suitable equipment. The selection of suitable deposition equipment depends on a number of factors including the deposition volume, the viscosity of the composition and the complexity of the part being fabricated. Each of the two or more components can be introduced into an independent pump and injected into a mixer to combine and mix the two components. A nozzle can be coupled to the mixer and the mixed composition can be pushed under pressure or extruded through the nozzle.

A pump can be, for example, a positive displacement pump, a syringe pump, a piston pump, or a progressive cavity pump. The two pumps delivering the two components can be placed in parallel or placed in series. A suitable pump can be capable of pushing a liquid or viscous liquid through a nozzle orifice. This process can also be referred to as extrusion. A component can be introduced into the mixer using two pumps in series.

For example, the first and second components can be deposited by dispensing materials through a disposable nozzle attached to a progressive cavity two-component dosing system such as a ViscoTec eco-DUO 450 precision dosing system, where the first and second components are mixed in-line. A two-component dosing system can comprise, for example, two progressive cavity pumps that separately dose reactants into a disposable static mixer dispenser or into a dynamic mixer. Other suitable pumps include positive displacement pumps, syringe pumps, piston pumps, and progressive cavity pumps. Upon dispensing, the materials of the first and second components form an extrudate which can be deposited onto a surface to provide an initial layer of material and successive layers on a base. The deposition system can be positioned orthogonal to the base, but also may be set at any suitable angle to form the extrudate such that the extrudate and deposition system form an obtuse angle with the extrudate being parallel to the base. The extrudate refers to the combined components, i.e., a composition, that have been mixed, for example, in a static mixer or in a dynamic mixer. The extrudate can be shaped upon passing through a nozzle.

The base, the deposition system, or both the base and the deposition system may be moved to build up a three-dimensional article. The motion can be made in a predetermined manner, which may be accomplished using any suitable CAD/CAM method and apparatus such as robotics and/or computerize machine tool interfaces.

An extrudate may be dispensed continuously or intermittently to form an initial layer and successive layers. For intermittent deposition, a dosing system may interface with a relay switch to shut off the pumps, such as the progressive cavity pumps and stop the flow of reactive materials. Any suitable switch such as an electromechanical switch that can be conveniently controlled by any suitable CAD/CAM methodology can be used.

A deposition system can include an in-line static and/or dynamic mixer as well as separate pressurized pumping compartments to hold the at least two components and feed the materials into the static and/or dynamic mixer. A mixer such as an active mixer can comprise a variable speed central impeller having high shear blades within a conical nozzle. A range of conical nozzles may be used which have an exit orifice dimension, for example, from 0.2 mm to 50 mm, from 0.5 mm to 40 mm, from 1 mm to 30 mm, or from 5 mm to 20 mm.

A range of static and/or dynamic mixing nozzles may be used which have, for example, an exit orifice dimension from 0.6 mm to 2.5 mm, and a length from 30 mm to 150 mm. For example, an exit orifice diameter can be from 0.2 mm to 4.0 mm, from 0.4 mm to 3.0 mm, from 0.6 mm to 2.5 mm, from 0.8 mm to 2 mm, or from 1.0 mm to 1.6 mm. A static mixer and/or dynamic can have a length, for example, from 10 mm to 200 mm, from 20 mm to 175 mm, from 30 mm to 150 mm, or from 50 mm to 100 mm. A mixing nozzle can include a static and/or dynamic mixing section and a dispensing section coupled to the static and/or dynamic mixing section. The static and/or dynamic mixing section can be configured to combine and mix the first and second components. The dispensing section can be, for example, a straight tube having any of the above orifice diameters. The length of the dispensing section can be configured to provide a region in which the components can begin to react and build viscosity before being deposited on the article. The length of the dispensing section can be selected, for example, based on the speed of deposition, the rate of reaction of the first and second components, and the desired viscosity.

First and second components can have a residence time in the static and/or dynamic mixing nozzle, for example, from 0.25 seconds to 5 seconds, from 0.3 seconds to 4 seconds, from 0.5 seconds to 3 seconds, or from 1 seconds to 3 seconds. Other residence times can be used as appropriate based on the curing chemistries and curing rates.

In general, a suitable residence time is less than the gel time of the composition. A suitable gel time can be less than 7 days, such as less than 3 days, such as less than 2 days. A gel time of the composition can be, for example, from 10 min to 7 days, such as 12 hours to 3 days, such as 24 hours to 2 days. Gel time is considered as the time following mixing when the composition is no longer stirrable by hand.

Compositions provided by the present disclosure can have a volume flow rate, for example, from 0.1 mL/min to 20,000 mL/min, such as from 1 mL/min to 12,000 mL/min, from 5 mL/min to 8,000 mL/min, or from 10 mL/min to 6,000 mL min. The volume flow rate can depend, for example, on the viscosity of the composition, the extrusion pressure, the nozzle diameter, and the reaction rate of the first and second components.

A composition can be used at a print speed, for example, from 1 mm/sec to 400 mm/sec, such as from 5 mm/sec to 300 mm/sec, from 10 mm/sec to 200 mm/sec, or from 15 mm/sec to 150 mm/sec. The printed speed can depend, for example, on the viscosity of the composition, the extrusion pressure, the nozzle diameter, and the reaction rate of the components. The print speed refers to the speed at which a nozzle used to extrude a composition move with respect to a surface onto which the composition is being deposited.

A static and/or dynamic mixing nozzle can be heated or cooled to control, for example, the rate of reaction between the first and second components and/or the viscosity of the first and second components. An orifice of a deposition nozzle can have any suitable shape and dimensions. A system can comprise multiple deposition nozzles. The nozzles can have a fixed orifice dimension and shape, or the nozzle orifice can be controllably adjusted. The mixer and/or the nozzle may be cooled to control an exotherm generated by the reaction of the first and second components.

Methods provided by the present disclosure include printing the composition on a fabricated part. Methods provided by the present disclosure include directly printing parts.

Using the methods provided by the present disclosure parts can be fabricated. The entire part can be formed from one of the compositions disclosed herein, one or more portions of a part can be formed from one of the compositions disclosed herein, one or more different portions of a part can be formed using the compositions disclosed herein, and/or one or surfaces of a part can be formed from a composition provided by the present disclosure. In addition, internal regions of a part can be formed from a composition provided by the present disclosure.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Illustrating the invention are the following examples, which, however, are not to be considered as limiting the invention to their details. Unless otherwise indicated, all parts and percentages in the following examples, as well as throughout the specification, are by volume.

EXAMPLES

TABLE 1

| Abbreviation Description of Matrix Materials | |
| --- | --- |
| Abbreviation or trade designation of matrix materials | Description |
| Thioplast G1 | Liquid Polysulfide Pre-polymer, end-capped by SH-functional end groups, available by Nouryon, Av. Molecular Weight: 3900-4400 g/mol |
| Thioplast G112 | Liquid Polysulfide Pre-polymer, end-capped by SH-functional end groups, available by Nouryon, Av. Molecular Weight: 3400-4600 g/mol |
| Thioplast G4 | Liquid Polysulfide Pre-polymer, end-capped by SH-functional end groups, available by Nouryon, Av. Molecular Weight: <1100 g/mol |
| PETMP | Pentaerythritol Tetra(3-mercaptopropionate) available by Bruno Bock Thiochemicals |
| Permapol P-3.1e | Liquid Polysulfide Pre-polymer, end-capped by SH-functional end groups, See U.S. Pat. No. 6,372,849 B2, Number Av. Molecular Weight: 500-20,000 g/mol. |

TABLE 1-continued

Abbreviation Description of Matrix Materials

| Abbreviation or trade designation of matrix materials | Description |
|---|---|
| Cure accelerator | Organic amine base or sulfur-donor component |
| Stearic acid | Fatty acid supplied as cas 57-11-4, available by Lanxess, Chemical Associates, Acme-Hardesty, BASF, Croda |
| HB-40 | Plasticizer available by EASTMAN |
| Methylon 75108 | Coating intermediate containing a mixture of the allyl ethers of mono-, di-, and trimethylol phenols. See U.S. Pat. No. 3,517,082 |
| P/S890 Class B Fuel Tank Sealant Part A | Part A of PS890 Class B Fuel Tank sealant, available by PPG |

TABLE 2

Abbreviation Description of Fillers Materials

| Abbreviation or trade designation of fillers | Particle Size (μm)* | True Density (g/ml) | Mohs Hardness | Description |
|---|---|---|---|---|
| Nabalox NO625-10 | 2.5 | 3.89 | 9 | Alumina fillers available from Nabaltec AG |
| Nabalox 105RA | 80 | 3.89 | 9 | Alumina fillers available from Nabaltec AG |
| TFZ-N15P | 16 | 3.28 | 5 | Aluminum nitride fillers available from Toyal America, Inc. |
| CTS25M | 300 | 2.1 | 2 | Boron nitride fillers available from Salnt-Gobaln Ceramic Materials |

TABLE 3

Formulation of thermally conductive sealants (Unit: gram)

| | Ex 1 | Ex 2 | Ex 3 | Ex 4 | Ex 5 | Ex 6 | Ex 7 | Ex 8 | Ex 9 |
|---|---|---|---|---|---|---|---|---|---|
| Part A | | | | | | | | | |
| Thioplast G1 | 10 | 10 | 10 | 10 | 10 | 5 | 5 | 5 | 10 |
| Thioplast G112 | 20 | 20 | 20 | 20 | 20 | 20 | 20 | 20 | 20 |
| Thioplast G4 | — | — | — | — | — | 5 | — | — | — |
| PETMP | — | — | — | — | — | — | 5 | — | — |
| Permapol e3.1 | — | — | — | — | — | — | — | 5 | — |
| Cure accelerator | 0.05 | 0.05 | 0.05 | 0.05 | 0.05 | 0.05 | 0.05 | 0.05 | 0.05 |
| Stearic acid | 0.25 | 0.25 | 0.25 | 0.25 | 0.25 | 0.25 | 0.25 | 0.25 | 0.25 |
| HB-40 | — | — | — | — | 4 | — | 4 | — | — |
| Nabalox NO 625-10 | 40 | — | — | 1 | 45 | 40 | 45 | 40 | — |
| Methylon 75108 | — | — | — | — | — | — | — | — | 4.55 |
| TFZN15P | — | 35 | — | — | — | — | — | — | — |
| Nabalox 102RA | — | — | — | 25 | — | — | — | — | — |
| CST25M | — | — | 10 | — | — | — | — | — | — |
| Part B | — | — | — | — | — | — | — | — | — |
| PS-890 B2 Part A | 6.06 | 6.06 | 6.06 | 6.06 | 6.86 | 6.06 | 6.86 | 6.06 | 6.06 |
| Nabalox NO 625-10 | — | — | — | — | — | 1 | — | — | — |

TABLE 4

Composition of cured thermally conductive sealants (Unit: volume %)

| Component | Ex 1 | Ex 2 | Ex 3 | Ex 4 | Ex 5 | Ex 6 | Ex 7 | Ex 8 | Ex 9 |
|---|---|---|---|---|---|---|---|---|---|
| Thioplast G1 | 20.74 | 20.53 | 24.34 | 22.95 | 18.00 | 10.27 | 9.00 | 10.26 | 25.00 |
| Thioplast 112 | 41.70 | 41.28 | 48.94 | 46.15 | 36.20 | 41.32 | 36.18 | 41.27 | 50.27 |
| Thioplast G4 | — | — | — | — | — | 10.53 | — | — | — |
| PETMP | — | — | — | — | — | — | 9.07 | — | — |
| Permapol e3.1 | — | — | — | — | — | — | — | 11.31 | — |
| Cure accelerator | 0.12 | 0.11 | 0.14 | 0.13 | 0.10 | 0.11 | 0.10 | 0.11 | 0.14 |
| Stearic acid | 0.71 | 0.70 | 0.83 | 0.79 | 0.62 | 0.70 | 0.62 | 0.70 | 0.86 |
| HB-40 | — | — | — | — | 9.17 | — | 9.16 | — | — |
| Methylon 75108 | — | — | — | — | — | — | — | — | 11.1 |
| PS-890 B2 Part A | 9.21 | 9.12 | 10.81 | 10.19 | 9.05 | 9.13 | 9.05 | 9.12 | 12.65 |
| Nabalox NO 625-10 | 27.51 | — | — | 0.76 | 26.87 | 27.93 | 26.85 | 27.22 | — |
| TFZN15P | — | 28.26 | — | — | — | — | — | — | — |
| Nabalox 102RA | — | — | — | 19.03 | — | — | — | — | — |
| CST25M | — | — | 14.95 | — | — | — | — | — | — |
| Total | 100.00 | 100.00 | 100.00 | 100.00 | 100.00 | 100.00 | 100.00 | 100.00 | 100.00 |

TABLE 5

| Thermal conductivity and Shore A hardness of cured thermally conductive sealants | | | | | | | | | |
|---|---|---|---|---|---|---|---|---|---|
| Properties | Ex 1 | Ex 2 | Ex 3 | Ex 4 | Ex 5 | Ex 6 | Ex 7 | Ex 8 | Ex 9 |
| Thermal conductivity (W/mK) | 0.55 | 0.416 | 0.796 | 0.53 | 0.489 | 0.439 | 0.54 | 0.573 | 0.23 |
| Shore A Hardness | 53.6 | 39.2 | 53.8 | 54.6 | 39.8 | 49.6 | 34.8 | 46 | 33 |

The cured samples were prepared according to the following procedure with all non-manual mixing performed using a Speedmixer DAC 600FVZ (commercially available from FlackTeck Inc.). For each example, part A was mixed with part B for 5 s at 800 rpm, and then 15 s at 1850 rpm. The mixing step was repeated. If the mixing appeared non-homogenous, the mixing step was repeated. The composition was then transferred into an aluminum (Al) weighing dish (Fisherbrand, Catalog No. 08-732-101), and allowed to cure for 2 days in an environmental chamber (50% RH, 25° C.) followed by 1 day at 140° F.

Thermal conductivity measurement. The samples were tested using a modified transient plane source method (conform to ASTM D7984) with a TCi thermal conductivity analyzer. The sample size was at least 20 mm×20 mm with a thickness of 5 mm. The weight placed on the sample during measurement was 500 g.

Hardness test. The samples were tested in accordance with ASTM D2240 with a Type A durometer at room temperature. The sample size was at least 20 mm×20 mm with a thickness of 6 mm.

TABLE 6

| Mechanical Properties of cured thermally conductive sealants | | | |
|---|---|---|---|
| Property | Ex 1 | Ex 3 | Ex 9 |
| Peel strength (lbf/in) | 3.5 | 4.1 | 2.0 |
| Elongation percentage (%) | 326.5 | 112.6 | 272.1 |
| Tensile stress at break (psi) | 139.0 | 129.8 | 111.19 |
| Young's modulus (MPa) | 2.49 | 3.81 | 0.82 |

Elongation percentage, tensile stress at break and Young's modulus measurement. Dog bone tensile specimens were prepared using the mixed materials and the sample size is in accordance with ISO 37-2. The elongation percentage, tensile strength and Young's modulus were determined according to ISO 37 on an Instron universal testing machine, model 3345 with a pull rate at 2 inches/min.

180° peel strength measurement. The sealant composition was applied onto an aluminum substrate (ASM 3281) which was pre-abraded with a scotch bright pad and primed with PPG commercial PR-188 adhesion promoter. The samples were cured for 2 days in an environmental chamber (50% RH, 25° C.) followed by 1 day at 49° C. The samples were tested using an Instron universal testing machine, model 3345 in accordance with SAE AS5127/1B.

We claim:

1. A composition, comprising:
a thiol-terminated compound;
an oxidant; and
a thermally conductive filler package comprising thermally conductive, electrically insulative filler particles, the thermally conductive, electrically insulative filler particles having a thermal conductivity of at least 5 W/m·K (measured according to ASTM D7984) and a volume resistivity of at least 1 Ω·m (measured according to ASTM D257),
wherein the thermally conductive, electrically insulative filler particles are present in an amount of at least 50% by volume based on total volume of the filler package, wherein the filler package further comprises thermally conductive, electrically conductive filler particles having a thermal conductivity of at least 5 W/m·K (measured according to ASTM D7984) and a volume resistivity of less than 1 Ohm·m (measured according to ASTM D257, C611, or B193), the thermally conductive, electrically conductive filler particles being present in an amount of no more than 30% by volume based on total volume of the filler package and/or non-thermally conductive, electrically insulative filler particles having a thermal conductivity of less than 5 W/mK (measured according to ASTM D7984) and a volume resistivity of at least 1 Ohm·m (measured according to ASTM D257, C611, or B193), the non-thermally conductive, electrically conductive filler particles being present in an amount of no more than 10% by volume based on total volume of the filler package.

2. The composition of claim 1, wherein the thermally conductive filler package is present in an amount of 15% by volume percent to 90% by volume based on total volume of the composition, the thiol-terminated compound is present in an amount of 9.9% by volume to 84.9% by volume based on total volume of the composition and/or the oxidant is present in an amount of 0.1% by volume to 10% by volume based on total volume of the resins.

3. The composition of claim 1, wherein the thiol-terminated compound comprises a liquid.

4. The composition of claim 1, wherein the thiol-terminated compound has an average molecular weight of 80 g/mol to 40,000 g/mol.

5. The composition of claim 1, wherein the oxidant comprises a metal oxide and/or an organic peroxide.

6. The composition of claim 1, further comprising a dispersant, a rheology modifier, a solvent, a plasticizer, an adhesion promoter, an antioxidant, a water scavenger, a thixotrope, a colorant, a tint, a tackifier, a thermoplastic polymer, a reactive diluent, a corrosion inhibitor, a UV stabilizer, a flame retardant, or combinations thereof.

7. The composition of claim 1, wherein the composition is capable of curing at ambient conditions.

8. A method of treating a substrate comprising:
contacting at least a portion of a surface of the substrate with the composition of claim 1.

9. A coating formed from the composition of claim 1, wherein the coating, in an at least partially cured state, has at least one of the following:
(a) a thermal conductivity of at least 0.4 W/m·K (measured according to ASTM D7984);
(b) a dielectric strength of at least 1 kV/mm measured according to ASTM D149 on a dielectric meter (Sefetec RMG12AC-DC) connected to two copper electrodes with 1-inch diameter;
(c) a shore A hardness 5 to 95 measured according to ASTM D2240 with a Type A durometer (Model 2000, Rex Gauge Company, Inc.) at room temperature;

(d) a 180° peel strength of at least 1 lbf/in (measured according to SAE AS5127/1B with an Instron universal testing machine, model 3345);

(e) a tensile stress at break of 1 MPa to 100 MPa, as determined according to ISO 37-2 using an Instron universal testing machine, model 3345 with a pull rate of 2 inches/min;

(f) an elongation of 1% to 900%, as determined according to ISO 37-2 using an Instron universal testing machine, model 3345 with a pull rate of 2 inches/min; and/or (g) a Young's modulus of 0.01 MPa to 100 MPa, as determined according to ISO 37-2 using an Instron universal testing machine, model 3345 with a pull rate of 2 inches/min.

10. A substrate comprising a surface, at least a portion of which is coated with the coating of claim 9.

11. The substrate of claim 10, wherein the substrate comprises a vehicle, a part, an article, an appliance, a personal electronic device, a circuit board, a multi-metal article, or combinations thereof.

12. The substrate of claim 11, wherein the vehicle comprises an automobile or an aircraft and/or the part comprises a thermally conductive part.

13. A battery assembly comprising:
a battery cell; and
the composition of claim 1, in an at least partially cured state, on a surface of the battery cell.

14. The battery assembly of claim 13, further comprising at least one second battery cell, a cooling fin, a cooling plate, and/or a battery box.

15. The battery assembly of claim 14, wherein the composition is positioned between the battery cell and the at least one second battery cell.

16. The battery assembly of claim 14, wherein the composition is positioned between the battery cell and the cooling plate.

17. A method of forming an article comprising extruding the composition of claim 1.

18. The method of claim 17, wherein the extruding comprises three-dimensional printing.

19. The article formed by the method of claim 17.

* * * * *